United States Patent
Milton et al.

(10) Patent No.: US 10,417,653 B2
(45) Date of Patent: Sep. 17, 2019

(54) INFERRING CONSUMER AFFINITIES BASED ON SHOPPING BEHAVIORS WITH UNSUPERVISED MACHINE LEARNING MODELS

(71) Applicant: PlaceIQ, Inc., New York, NY (US)

(72) Inventors: Stephen Milton, Lyons, CO (US); Duncan McCall, Greenwhich, CT (US)

(73) Assignee: PlaceIQ, Inc., New York, NY (US)

( * ) Notice: Subject to any disclaimer, the term of this patent is extended or adjusted under 35 U.S.C. 154(b) by 490 days.

(21) Appl. No.: 15/140,762

(22) Filed: Apr. 28, 2016

(65) Prior Publication Data
US 2016/0239857 A1 Aug. 18, 2016

Related U.S. Application Data

(63) Continuation-in-part of application No. 14/667,371, filed on Mar. 24, 2015, now Pat. No. 10,262,330, and
(Continued)

(51) Int. Cl.
*G06F 16/00* (2019.01)
*G06Q 30/02* (2012.01)
*H04W 4/029* (2018.01)

(52) U.S. Cl.
CPC ......... *G06Q 30/0205* (2013.01); *G06Q 30/02* (2013.01); *G06Q 30/0201* (2013.01); *H04W 4/029* (2018.02)

(58) Field of Classification Search
CPC ............... G06Q 30/02; G06Q 30/0201; G06Q 30/0205; H04W 4/029; G06F 16/29
See application file for complete search history.

(56) References Cited

U.S. PATENT DOCUMENTS 6,839,682 B1 * 1/2005 Blume ............... G06Q 30/02
705/14.4
7,649,853 B1 * 1/2010 Nucci ............... H04L 41/022
370/252
(Continued)

OTHER PUBLICATIONS

Big Data Clustering: Algorithms and Challenges, International Conference on Big Data, Cloud and Applications BDCA'15, May 2015, pp. 1 to 6.
(Continued)

*Primary Examiner* — Dinku W Gebresenbet
(74) *Attorney, Agent, or Firm* — Pillsbury Winthrop Shaw Pittman LLP

(57) ABSTRACT

A process of discovering psychographic segments of consumers with unsupervised machine learning. A first set of consumer-behavior is converted into respective consumer-behavior vectors for training an unsupervised machine learning model. The unsupervised machine learning model is trained with the first set of consumer-behavior vectors to determine psychographic segments of consumers. A second set of consumer-behavior records is obtained after determining the psychographic segments of consumers and the second set of consumer-behavior records is converted into respective consumer-behavior vectors. The second set of consumer-behavior vectors is classified as each belonging to at least a respective one of psychographic segments with the trained machine learning model to predict, based on the classification, a likelihood of the respective consumer engaging in behavior associated with a corresponding one of the psychographic segments.

24 Claims, 5 Drawing Sheets

Related U.S. Application Data a continuation-in-part of application No. 13/769,736, filed on Feb. 18, 2013, and a continuation-in-part of application No. 13/938,974, filed on Jul. 10, 2013, now abandoned, and a continuation-in-part of application No. 14/334,066, filed on Jul. 17, 2014, now Pat. No. 9,589,280, and a continuation-in-part of application No. 14/553,422, filed on Nov. 25, 2014, and a continuation-in-part of application No. 14/802,020, filed on Jul. 17, 2015, now Pat. No. 10,235,683, and a continuation-in-part of application No. 14/886,841, filed on Oct. 19, 2015, now Pat. No. 10,218,808, and a continuation-in-part of application No. 15/009,053, filed on Jan. 28, 2016, now Pat. No. 9,483,498, which is a continuation of application No. 13/918,576, filed on Jun. 14, 2013, now Pat. No. 9,275,114, which is a continuation of application No. 13/734,674, filed on Jan. 4, 2013, now Pat. No. 8,489,596.

(60) Provisional application No. 62/153,914, filed on Apr. 28, 2015, provisional application No. 61/969,661, filed on Mar. 24, 2014, provisional application No. 61/847,083, filed on Jul. 17, 2013, provisional application No. 61/908,560, filed on Nov. 25, 2013, provisional application No. 62/026,128, filed on Jul. 18, 2014, provisional application No. 62/066,100, filed on Oct. 20, 2014.

(56) References Cited

U.S. PATENT DOCUMENTS

| | | |
|---|---|---|
| 2002/0099702 A1 | 7/2002 | Oddo |
| 2005/0033709 A1* | 2/2005 | Meng ............... G06N 3/08 706/25 |
| 2005/0177449 A1* | 8/2005 | Temares ............ G06Q 30/02 705/7.33 |
| 2011/0040601 A1* | 2/2011 | Bai .................. G06Q 30/02 705/7.29 |
| 2012/0215625 A1 | 8/2012 | Ramer et al. |
| 2014/0195530 A1 | 7/2014 | Milton et al. |
| 2014/0236669 A1 | 8/2014 | Milton et al. |
| 2014/0258198 A1 | 9/2014 | Spivack et al. |
| 2014/0289765 A1 | 9/2014 | Kitts et al. |
| 2014/0379424 A1 | 12/2014 | Shroff |
| 2015/0100388 A1 | 4/2015 | Mitchler et al. |
| 2015/0100426 A1 | 4/2015 | Hartzell et al. |

OTHER PUBLICATIONS

Convex Hulls under Uncertainty, Algorithms—ESA 2014, vol. 8737 of the series Lecture Notes in Computer Science pp. 37-48.
Mixture Models, Latent Variables and the EM Algorithm, 36-402, Advanced Data Analysis, Mar. 31, 2011, pp. 1 to 12.

* cited by examiner

INFERRING CONSUMER AFFINITIES BASED ON SHOPPING BEHAVIORS WITH UNSUPERVISED MACHINE LEARNING MODELS

CROSS-REFERENCE TO RELATED APPLICATIONS

The present patent claims the benefit of U.S. Provisional Patent 62/153,914, filed 28 Apr. 2015, titled "Inferring Consumer Affinities Based On Shopping Behaviors," and is a continuation-in-part of U.S. patent application Ser. No. 14/667,371, titled "LOCATION-BASED ANALYTIC PLATFORM AND METHODS," filed 24 Mar. 2015, which claims the benefit of U.S. Provisional Patent Application 61/969,661, titled "LOCATION-BASED ANALYTIC PLATFORM AND METHODS," filed 24 Mar. 2014; is a continuation-in-part of U.S. patent application Ser. No. 15/009,053, titled "APPARATUS AND METHOD FOR PROFILING USERS, filed 28 Jan. 2016, which is a continuation of U.S. Pat. No. 9,275,114, titled "Apparatus and Method for Profiling Users," filed 14 Jun. 2013, which is a continuation of U.S. Pat. No. 8,489,596, titled "Apparatus and Method for Profiling Users," filed 4 Jan. 2013; is a continuation-in-part of U.S. patent application Ser. No. 13/769,736, titled "Apparatus and Method for Identifying and Employing Visitation Rates," filed 18 Feb. 2013; is a continuation-in-part of U.S. patent application Ser. No. 13/938,974, titled "PROJECTING LOWER-GEOGRAPHIC-RESOLUTION DATA ONTO HIGHER-GEOGRAPHIC-RESOLUTION AREAS," filed 10 Jul. 2013; is a continuation-in-part of U.S. patent application Ser. No. 14/334,066, titled "Matching Anonymized User Identifiers Across Differently Anonymized Data Sets," filed 17 Jul. 2014, which claims the benefit of U.S. Provisional Patent Application 61/847,083, titled "Matching Anonymized User Identifiers Across Differently Anonymized Data Sets," filed 17 Jul. 2013; is a continuation-in-part of U.S. patent application Ser. No. 14/553,422, titled "Apparatus and Method for Determining the Quality or Accuracy of Reported Locations," filed 25 Nov. 2014, which claims the benefit of U.S. Patent Application 61/908,560, titled "APPARATUS AND METHOD FOR DETERMINING THE QUALITY OR ACCURACY OF REPORTED LOCATIONS," filed 25 Nov. 2013; is a continuation-in-part of U.S. patent application Ser. No. 14/802,020, titled "Analyzing Mobile-Device Location Histories To Characterize Consumer Behavior," filed 17 Jul. 2015, which claims the benefit of U.S. Provisional Patent Application 62/026,128, titled "Analyzing Mobile-Device Location Histories To Characterize Consumer Behavior," filed 18 Jul. 2014; and is a continuation-in-part of U.S. patent application Ser. No. 14/886,841, titled "SCRIPTING DISTRIBUTED, PARALLEL PROGRAMS," filed 19 Oct. 2015, which claims the benefit of U.S. Provisional Patent Application 62/066,100, titled "Scripting Distributed, Parallel Programs," filed 20 Oct. 2014. Each listed parent application is hereby incorporated by reference in its entirety.

BACKGROUND

1. Field

The present invention relates generally to computer systems and, more specifically, to techniques for inferring consumer affinities based on shopping behavior with unsupervised machine learning models.

2. Description of the Related Art

Geolocation analytics platforms are generally used to understand human behavior. Such systems map data about places to geographic locations and then this mapping is used to analyze patterns in human behavior based on people's presence in those geographic locations. For example, researchers may use such systems to understand patterns in health, educational, crime, or political outcomes in geographic areas. And some companies use such systems to understand the nature of their physical locations, analyzing, for instance, the demographics of customers who visit their stores, restaurants, or other facilities. Some companies use such systems to measure and understand the results of TV advertising campaigns, detecting changes in the types of customers who visit stores following a campaign. Some companies use geolocation analytics platforms to target content to geolocations, e.g., selecting content like business listings, advertisements, billboards, mailings, restaurant reviews, and the like, based on human behavior associated with locations to which the content is directed. In many contexts, location can be a useful indicator of human behavior.

In some cases, people are classified as being members of various audiences, or relatively homogenous populations in terms of expected behavior (e.g., propensity to attain an educational outcome, respond favorably to content, visit a store, etc.). One criteria for identifying audiences is a person's current geographic location. Often the location of people is indicative of various likely behaviors. The designation of audiences can be helpful in a variety of contexts. In the political sphere, swing voters constitute a type of audience. Or in the realm of education services, at-risk students can constitute another type of audience. Government services and commercial real-estate site selection may also be influenced by behaviors of audiences, e.g., a decision to position a restaurant franchise near a place members of an audience frequent during lunch hours.

Many existing systems define audiences with insufficient specificity. In some cases, a user's current location is relatively poorly correlated with behavior. Tourists in New York would likely not be interested in reviews of local plumbers, for example. Yet discovering more precise descriptors of audiences can be difficult. Often data about users is relatively high-dimensioned, including, for instance, location history, purchasing behavior, social network behavior, and the like. Selecting and properly balancing among values in these various dimensions can be difficult, so those evaluating such data often disregard meaningful information in records about people.

Similar issues arise when segmenting audiences and larger populations according to their behavior as consumers. Often, the relevant segments are not know ex ante, so labeled training sets are often unavailable to construct and refine predictive models. Further, adequately processing data indicative of consumer at commercially relevant scales is often beyond the capabilities of many traditional analytical systems. In many cases, the diversity of consumer behavior often warrants relatively long-tailed sets of segments, and these segments are, in many cases, only revealed when processing relatively large data sets, e.g., describing behavior of millions of consumers.

SUMMARY

The following is a non-exhaustive listing of some aspects of the present techniques. These and other aspects are described in the following disclosure.

Some aspects include a process of discovering psychographic segments of consumers with unsupervised machine learning, the process including: obtaining, with one or more computers, a first set of more than 10,000 consumer-behavior records, each consumer-behavior record indicating, for a respective consumer, at least two businesses patronized by the respective consumer; converting, with one or more computers, the first set of consumer-behavior records into respective consumer-behavior vectors in a first set of consumer-behavior vectors; determining, with one or more computers, more than 5 psychographic segments of consumers by training an unsupervised machine learning model with the first set of consumer-behavior vectors, wherein the first set of consumer-behavior vectors are not labeled as members of any of the psychographic segments before determining the psychographic segments; obtaining, with one or more computers, a second set of consumer-behavior records after determining the psychographic segments of consumers; converting, with one or more computers, the second set of consumer-behavior records into respective consumer-behavior vectors in a second set of consumer-behavior vectors; classifying, with one or more computers, the second set of consumer-behavior vectors as each belonging to at least a respective one of psychographic segments with the trained machine learning model; and predicting, with one or more computers, based on the classification, for each of the second set of consumer behavior records, a likelihood of the respective consumer engaging in behavior associated with a corresponding one of the psychographic segments.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
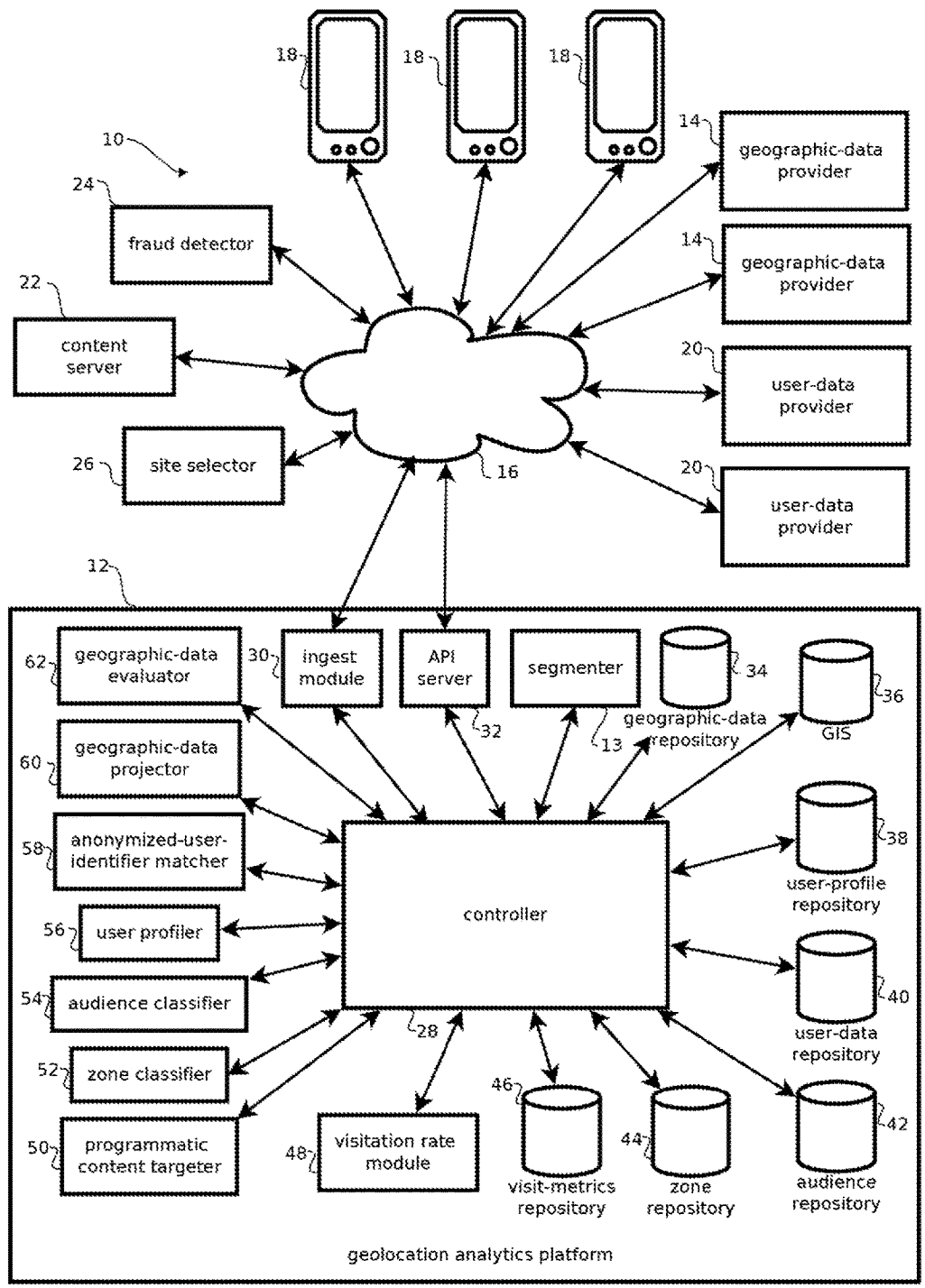
FIG. 1 shows an example of a computing environment having a location analytics platform consistent with the present techniques.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of geolocation and psychographic analytics. Indeed, the inventors wish to emphasize the difficulty of recognizing those problems that are nascent and will become much more apparent in the future should trends in the geolocation analytics industry continue as the inventors expect. Further, because multiple problems are addressed, it should be understood that some embodiments are problem-specific, and not all embodiments address every problem with traditional systems described herein or provide every benefit described herein. That said, solutions to many of these problems are described below.

FIG. 1 illustrates a computing environment 10 having a geolocation analytics platform 12 with a segmenter 13 that, in some embodiments, discovers meaningful ways of segmenting consumers based on their past behavior and applies those segments to make inferences about future consumer behavior. In some cases, the segmenter 13 executes a process described below with reference to FIG. 4 that makes these inferences with unsupervised machine learning models configured to operate on relatively large-scale data sets (e.g., extending into data sets describing more than one million, and in some cases more than ten million, consumers).

The segmenter 13 complements operations of an analytics platform 12 that, in some embodiments, classifies users as belonging to audiences based on relatively high dimensional data (e.g., based on more than ten, or more, and in many cases substantially more, dimensions). In some cases, audiences are segmented, or some embodiments may join audiences with segments to make more powerful inferences. Further, as explained below, some embodiments may perform such classification based on diverse and, in some cases, unreliable data about consumer behavior by detecting and mitigating the effects of such data, while capturing some of the benefits of comprehensive data sets. That said, not all embodiments provide these benefits, as several independently useful inventions are described herein.

Embodiments of the geolocation analytics platform 12 may be implemented with one or more of the computing devices described below with reference to FIG. 5, e.g., by processors executing instructions stored in the below-described memory for providing the functionality described herein. FIG. 1 shows a functional block diagram of an example of the geolocation analytics platform 12. While the functionality is shown organized in discrete functional blocks for purposes of explaining the software and hardware by which the geolocation analytics platform 12 may be implemented in some embodiments, is important to note that such hardware and software may be intermingled, conjoined, subdivided, replicated, or otherwise differently arranged relative to the illustrated functional blocks. Due to the size of some geographic data sets (which may be as large as 100 billion content requests or geolocations, or larger, in some use cases), some embodiments may include a plurality of instances of the geolocation analytics platform 12 operating concurrently to evaluate data in parallel and some embodiments may include multiple instances of computing devices instantiating multiple instances of some or all of the components of the geolocation analytics platform 12, depending on cost and time constraints.

The geolocation analytics platform 12 may be understood in view of the exemplary computing environment 10 in which it operates. As shown in FIG. 1, the computing environment 10 further includes a plurality of geographic-data providers 14, the Internet 16, a plurality of mobile user devices 18, a plurality of user-data providers 20, a content server 22, a fraud detector 24, and a site selector 26. While a relatively small number of the above-described components are illustrated, it should be understood that embodiments are consistent with, and likely to include, substantially more of each component, such as dozens of geographic-data providers 14 and user data providers 20, hundreds of fraud detectors 24, content servers 22, and site selectors 26, and millions or tens of millions of user mobile devices 18. Each of these components may communicate with the geolocation analytics platform 12 or one another via the Internet 16. Some such communications may be used to either provide data by which audiences are classified according to geolocation history and other parameters, and some embodiments may use classified audiences for various purposes, such as serving content, detecting financial fraud, selecting real-estate sites, or the like. The components of the computing environment 10 may connect to one another through the Internet 16 and, in some cases, via various other networks, such as cellular networks, local area networks, wireless area networks, personal area networks, and the like.

FIG. 1 shows three geographic-data providers 14, but again, embodiments are consistent with substantially more instances, for example, numbering in the hundreds of thousands. The geographic-data providers 14 are shown as network connected devices, for example, servers hosting application program interfaces (APIs) by which geographic data is requested by the geolocation analytics platform 12, or in webpages from which such data is retrieved or otherwise extracted. It should be noted, however, that in some cases the geographic data may be provided by other modes of transport. For instance, hard-disk drives, optical media, flash drives, or other memory may be shipped by physical mail and copied via a local area network to on-board memory accessible to the geolocation analytics platform 12. In some cases, the geographic data is acquired in batches, for example, periodically, such as daily, weekly, monthly, or yearly, but embodiments are consistent with continuous (e.g., real-time) data feeds as well. Thus in some cases, the geographic-data providers 14 may provide geolocation histories that are non-contemporaneous (relative to when they are acquired) and span a relatively large period of time, such as several hours, several weeks, or several months in the past.

In many cases, the entity operating the geolocation analytics platform 12 does not have control over the quality or accuracy of the provided geographic data, as that data is often provided by a third-party, for instance, sellers of geocoded advertising inventory, the data being provided in the form of ad request logs from various publishers. For instance, the geographic-data providers 14 may be mobile website publishers, retargeting services, and providers of mobile device applications, or native apps. In some cases, the geographic data comprehensively canvasses a large geographic region, for example, every zip code, county, province, or state within a country, or the geographic data may be specific to a particular area, for example, within a single province or state for data gathered by local government or local businesses. Publishers acting as the provider of the geographic data may be an entity with geocoded advertising inventory to sell, e.g., ad impressions up for auction (e.g., logged over time) that are associated with a geographic location at which the entity represents the ad will be presented. In some cases, pricing for such advertising inventory is a function, in part, of the quality and accuracy of the associated geographic locations.

In some cases, the geographic-data providers 14 may provide location history data (e.g., from the mobile devices 18), such as ad request logs indicating, for instance, a plurality of requests for advertisements from publishers (e.g., operators of various websites or mobile device native applications), each request being for an advertisements to be served at a geolocation specified in the request. The geographic location specified in a given request may be used by an advertiser to determine whether to bid on or purchase the right to supply the requested advertisement, and the amount an advertiser wishes to pay may depend on the accuracy and quality of the identified geolocation. These location history records may contain a plurality of such requests, each having a geolocation (e.g., a latitude coordinate and a longitude coordinate specifying where a requested ad will be served), a unique identifier such as a mobile device ID (e.g., a device identifier of a end user device 18 upon which the ad will be shown) and a timestamp. In some cases, the device identifier may be a Unique Device Identifier (UDID) or an advertiser or advertising specific identifier, such as an advertising ID.

In FIG. 1, three mobile user devices 18 are illustrated, but it should be understood that embodiments are consistent with (and most use cases entail) substantially more user devices, e.g., more than 100,000 or more than one million user devices. The illustrated user devices 18 may be mobile handheld user devices, such as smart phones, tablets, or the like, having a portable power supply (e.g., a battery) and a wireless connection, for example, a cellular or a wireless area network interface, or wearable user devices, like smart watches and head-mounted displays. Examples of computing devices that, in some cases, are mobile devices are described below with reference to FIG. 5. User devices 18, however, are not limited to handheld mobile devices, and may include desktop computers, laptops, vehicle in-dash computing systems, living room set-top boxes, and public kiosks having computer interfaces. In some cases, the user devices 18 number in the millions or hundreds of millions and are geographically distributed, for example, over an entire country or the planet.

Each user devices 18 may include a processor and memory storing an operating system and various special-purpose applications, such as a browser by which webpages and advertisements are presented, or special-purpose native applications, such as weather applications, games, social-networking applications, shopping applications, and the like. In some cases, the user devices 18 include a location sensor, such as a global positioning system (GPS) sensor (or GLONASS, Galileo, or Compass sensor) or other components by which geographic location is obtained, for instance, based on the current wireless environment of the mobile device, like SSIDs of nearby wireless base stations, or identifiers of cellular towers in range. In some cases, the geographic locations sensed by the user devices 18 may be reported to the content server 22 for selecting content based on location to be shown on the mobile devices 18, and in some cases, location histories (e.g., a sequence of timestamps and geographic location coordinates) are acquired by the geographic-data providers 20, which may include content providers. In other cases, geographic locations are inferred by, for instance, an IP address through which a given device 18 communicates via the Internet 16, which may be a less accurate measure than GPS-determined locations. Or in some cases, geographic location is determined based on a cell tower to which a device 18 is wirelessly connected. Depending on how the geographic data is acquired and subsequently processed, that data may have better or less reliable quality and accuracy.

In some use cases, the number of people in a particular geographic area at a particular time as indicated by such location histories may be used to update records in the geolocation analytics platform 12. Location histories may be acquired by batch, e.g., from application program interfaces (APIs) of third-party providers, like cellular-network operators, advertising networks, or providers of mobile applications. Batch formatted location histories are often more readily available than real-time locations, while still being adequate for characterizing longer term trends in geographic data. And some embodiments may acquire some locations in real time (e.g., within 2 seconds of a request), for instance, for selecting content (like an advertisement, review, article, or business listing) to be displayed based on the current location.

The user-data providers 20 may provide data about users that is not necessarily tied to geolocation, such as purchasing history, media viewing history, automotive records, social networking activity, and the like. In some cases, user-data providers 20 include credit card processors, banks, cable companies, or television rating services. In some embodiments, user-data providers include microblogging services, location check-in services, or various other social networks. In some cases, audience classification according to geolocation may be supplemented with such data, for instance, according to the appearance of various keywords in social network posts, linkages between users indicated by social networks, or patterns in buying or reviewing behavior. In some cases, various features may be extracted from such data and included in the analysis described below for identifying audiences.

The illustrated content server 22 is operative to receive a request for content, select content (e.g., images and text), and send the content for display or other presentation to a user. One content server 22 is shown, but embodiments are consistent with substantially more, for example, numbering in the thousands. In some cases, the content is advertisements and advertisements are selected or bid upon with a price selected based on the geographic location of a computing device upon which an advertisement will be shown, which may be indicated by one of the geographic-data providers/content servers, or such entities may also be a publisher selling the advertising inventory. Accordingly, the accuracy and quality of such geographic data may be of relevance to the parties selling or buying such advertising space. The selection or pricing of advertisements may also depend on other factors. For example, advertisers may specify a certain bid amount based on the attributes of the geographic area documented in the geolocation analytics platform 12, or the advertiser may apply various thresholds, requiring certain attributes before an advertisement served, to target advertisements appropriately.

Some embodiments include a fraud detector 24 which may include an automated process run by a financial institution that detects anomalous behavior indicative of fraud based, in part, on correlations (or lack thereof) between financial transactions and patterns identified by the geolocation analytics platform 12. For instance, in some embodiments, the fraud detector 24 may submit a query to the geolocation analytics platform 12 based on a financial transaction, such as the purchase of a particular type of automobile, and the geolocation analytics platform 12 may respond with an audience classification of the user. In some embodiments the fraud detector 24 may determine whether the user who engaged in the financial transaction is likely to be a member of the audience for such purchases based on the data provided by the geolocation analytics platform 12. For example, a user who is not a member of an audience in Austin, Tex. that is present in Austin golf courses regularly, upon purchasing a set of golf clubs, may trigger a fraud alert, when the fraud detector receives a report for the geolocation analytics platform 12 that the user is not a member of an Austin, Tex., golf-playing audience. In some cases, the fraud detector may maintain an ontology of types of financial transactions and audiences associated with those transactions. Upon receiving a record of a financial transaction, the fraud detector may query audiences corresponding to the user, the location, and the time of the transaction, and determine whether the responsive audiences match those associated with the type of financial transaction in the ontology. Fraud may be detected based on the absence of such matches.

In some embodiments, the site selector 26 may categorize geographic areas as appropriate sites for various activities, such as positioning stores, allocating government resources, or distributing content into various zones based on geolocations frequented by audiences identified by the geolocation analytics platform 12. For instance, the site selector 26 may submit a request for zones in which members of a particular audience are present during lunch time and position restaurants in those zones.

In some embodiments, the geolocation analytics platform 12 may include a controller 28 that directs the activity of and routes data between the various components of the geolocation analytics platform 12. In some cases, the functionality of the controller may be divided into various processes, such as a separate controller for ingesting data, cleaning and normalizing data, classifying audiences and zones, targeting content, and evaluating the success of such targeting in driving visitation to various geographic locations. In some embodiments, activities other than programmatic content targeting may be performed as batch processes at times scheduled by the controller 28, such as daily or hourly, non-contemporaneously with when such data is used, to facilitate faster responses when the pre-processed data is used.

Some embodiments may include an ingest module 30 operative to retrieve data from the geographic-data providers 14 and user-data providers 20 via various APIs of such services. In some cases, such data may be routed by the controller 28 to a geographic data evaluator 62, examples of which are described in U.S. patent application Ser. No. 14/553,422, which is incorporated by reference in its entirety. The geographic-data evaluator may evaluate the quality of geographic data by geographic data provider and detect suspect, low-quality geographic data. Data from such providers with a history of providing low-quality data may be rejected from, or down-weighted in, the analyses described below, or such data providers may be stored with corresponding scores for purposes of bidding on the opportunity to serve advertisements or other content via such providers, for instance, in response to a content request for a website hosted by such a geographic-data provider.

Some embodiments may include an application program interface server 32, which may receive requests for information about audiences and geographic locations from the various entities operating devices 22, 24, and 26. In some cases, this may include requests by a third party content targeter for audiences corresponding to a current user device, at a current geolocation, requesting content at a current time (e.g., within the previous two seconds or so). In some cases, responsive data may include a list of audiences corresponding to these inputs or a list of scores for a plurality of audiences indicative of how well those inputs correspond to those audiences. In other examples, the request may include a request for an inventory of geographic areas corresponding to a specified audience, such as geographic areas or categories of places frequented by mobile device users who also frequent a given store or category of stores.

Some embodiments may include a geographic-data repository 34. The geographic-data repository 34, in some embodiments, stores geographic data from the geographic-data providers 14 and associated quality profiles of the geographic data, including measures of geographic data quality and accuracy provided by the geographic-data evaluator 62. In some embodiments, content providers, such as advertisers, or publishers, or others interested in the quality of geographic data from a given data provider 14 may query the geographic-data repository 34 for information output by the geographic-data evaluator 62.

Some embodiments may include a geographic information system 36. The geographic information system 36 may be configured to provide information about geographic locations in response to queries specifying a location or attribute of interest (or combinations thereof). In some embodiments, the geographic information system (GIS) 36 organizes information about a geographic area by quantizing (or otherwise dividing) the geographic area into area units, called tiles, that are mapped to subsets of the geographic area. In some cases, the tiles correspond to square units of area having sides that are between 10-meters and 1000-meters, for example, approximately 100-meters per side, depending upon the desired granularity with which a geographic area is to be described. Tiles are, however, not limited to square-shaped tiles, and may include other tilings, such as a hexagonal tiling, a triangular tiling, or other regular tilings (e.g., for simpler processing), semi-regular tilings, or irregular tilings (e.g., for describing higher density areas with higher resolution tiles, while conserving memory with larger tiles representing less dense areas). In some cases, such tilings may facilitate relatively fast access to data, such as in-memory data structures responsive to queries without retrieving data from a hard disk, though embodiments are not limited to systems that provide this benefit, which is not to suggest that any other feature described herein may also be omitted in some embodiments.

In some cases, polygons corresponding to businesses and other places, points corresponding to points of interest, and lines corresponding to roads, railroad tracks, and the like may also be stored in the geographic information system 36 as geographic features. In some cases, attributes of tiles overlapping such features may be mapped to these features, e.g., in proportion to the amount of area of a tile occupied by the corresponding feature and as a weighted combination of multiple tiles in which such a feature may be disposed, for instance, with such weights being proportional to the amount area of the feature in each respective tile. In some cases, the described attributes of the tiles may be mapped directly to the features, e.g., with a record for each such a feature, or subset of such a feature, like a floor of a store, or aisle of a store, with the features grouped according to the tile in which they are disposed for relatively fast searching of features by first retrieving a group of features in a single tile. To simplify the mapping, in some cases, irregular tiles may correspond to the boundaries of features.

In some cases, the attributes of a geographic area change over time. Accordingly, some embodiments divide each tile (or feature, if characterized separately, for example) according to time. For instance, some embodiments divide each tile into subsets of some duration of time, such as one week, one month, or one year, and attributes of the tile are recorded for subsets of that period of time. For example, the period of time may be one week, and each tile may be divided by portions of the week selected in view of the way users generally organize their week, accounting, for instance, for differences between work days and weekends, work hours, after work hours, mealtimes, typical sleep hours, and the like. Examples of such time divisions may include a duration for a tile corresponding to Monday morning from 6 AM to 8 AM, during which users often eat breakfast and commute to work, 8 AM till 11 AM, during which users often are at work, 11 AM till 1 PM, during which users are often eating lunch, 1 PM till 5 PM, during which users are often engaged in work, 5 PM till 6 PM, during which users are often commuting home, and the like. Similar durations may be selected for weekend days, for example 8 PM till midnight on Saturdays, during which users are often engaged in leisure activities. In some cases the divisions of time are logically connected but are disjoint, for instance, morning and evening commute times may be classified in a single category of time corresponding to commuting. Each of these durations may be profiled at each tile.

In some embodiments, the geographic information system 36 includes a plurality of tile (or feature, if separately tracked) records, each such record corresponding to a different subset of a geographic area. Each tile (or feature) record may include an identifier, an indication of geographic area corresponding to the tile (which for regularly sized tiles may be the identifier from which location can be calculated or may be a polygon with latitude and longitude vertices, for instance), and a plurality of tile-time records. Each tile-time record may correspond to one of the above-mentioned divisions of time for a given tile, and the tile-time records may characterize attributes of the tile at different points of time, such as during different times of the week. Each tile-time (or feature-time) record may also include a density score indicative of the number of people in the tile at a given time. In some embodiments, each tile-time record includes an indication of the duration of time described by the record (e.g., lunch time on Sundays, or dinnertime on Wednesdays) and a plurality of attribute records, each attribute record describing an attribute of the tile at the corresponding window of time during some cycle (e.g., weekly). Some embodiments may include seasonal variants of such time designations, e.g., a set of time categories for the Christmas season, a set for Summer, and a set for the remainder of the year, constituting a type of time-tile record called a time-tile-season record.

The attributes may be descriptions of activities in which users (e.g., of third party services that provide data to the geolocation analytics platform 12) engage that are potentially of interest to advertisers or others interested in geographic data about human activities and attributes (e.g., geodemographic data or geopsychographic data). For example, some advertisers may be interested in when and where users go to particular types of restaurants, when and where users play golf, when and where users watch sports, when and where users fish, or when and where users work in particular categories of jobs. In some embodiments, each tile-time record may include a relatively large number of attribute records, for example, more than 10, more than 100, more than 1000, or approximately 4000 attribute records, depending upon the desired specificity with which the tiles are to be described. Each attribute record may include an indicator of the attribute being characterized and an attribute score indicating the degree to which users tend to engage in activities corresponding to the attribute in the corresponding tile at the corresponding duration of time. In some cases, the attribute score (or tile-time record) is characterized by a density score indicating the number of users expected to engage in the corresponding activity in the tile at the time. In some cases, attributes may be organized in a hierarchical ontology, for instance, businesses→retail→convenience_stores, or demographic→suburbanite→young_professional.

Thus, to use some embodiments of the geographic information system 36, a query may be submitted to determine what sort of activities users engage in at a particular block in downtown New York during Friday evenings, and the geographic information system 36 may respond with the attribute records corresponding to that block at that time. Those attribute records may indicate a relatively high attribute score for high-end dining, indicating that users typically go to restaurants in this category at that time in this place, and a relatively low attribute score for playing golf, for example. Or a query may request tiles or features for which a given attribute score is exhibited. Attribute scores may be normalized, for example, a value from 0 to 10, with a value indicating the propensity of users to exhibit behavior described by that attribute. In some cases, scoring attributes according to a discrete set of normalized values may facilitate use of in-memory data structures that provide relatively fast access to information, though embodiments are not limited to systems that provide this benefit, which is not to suggest that any other feature described herein may also be omitted in some embodiments. Further, the attribute scores may be pre-calculated before such scores are used in an analysis, as some forms of analysis are relatively latency sensitive, such as content selection, which users are expected prefer to have happen within less than 500 milliseconds, while calculating attribute scores may take substantially longer.

In some cases, the user-profile repository 38 may store profiles of users of mobile devices 18 that are based on a user's geolocation history and in some cases data from user-data providers 20. In some cases, these user profiles may be created by a user profiler 56, an example of which is described in U.S. Pat. No. 8,489,596, the entire contents of which are incorporated by reference. The user profiler 56 may join the location histories of user devices corresponding to a user and tile records implicated by locations in those location histories to generate user profiles. Thus, users may be characterized according to the attributes of the places those users visit at the time the user visits those places. The generated user profiles may then be stored by the user profiler 56 in the user-profile repository 38.

The illustrated user-profile repository 38 includes a plurality of user-profile records, each record corresponding to the profile of a given user or a given mobile device 18. Each user-profile record may include an identifier of the record (which may be a value otherwise uncorrelated with the identity of the user to enhance privacy), and an identifier of the source or sources of the location histories from which the profile was created such that subsequent location histories can be matched with the profile (e.g. a account associated with a special-purpose native application, a cell phone number, or some other value, which may be hashed to enhance user privacy).

Each user-profile record may also include a plurality of profile time (or profile-time-season) records indicating attributes of the user profile at different times during some cycle of time (e.g., portions of the week or month, or during other periods like those described above with reference to the geographic information system 36). In some cases, the profile-time records may correspond to the same durations of time as those of the time-tile records described above. Each profile-time record may include an indication of the duration of time being described (e.g. Thursdays at dinnertime, or Saturday midmorning) and a plurality of profile attribute records, each profile attribute record indicating the propensity of the corresponding user to engage in an activity, or exhibit a property, described by the attribute during the corresponding time of the profile-time record. The profile time records may allow tracking of when users tend to engage in a given activity (e.g., time of day, day of week, week of year). In some embodiments, the profile attribute records correspond to the same set of attribute records described above with reference to the geographic information system 36. Each profile-attribute record may include an indication of the attribute being characterized (e.g., attending a children's soccer game, having brunch at a fast-casual dining establishment, parent running errands, or shopping at a mall) and a score indicating the propensity of the user to engage in the activity at the corresponding time, such as a normalized value from 0 to 10. The attribute records may further include a sample size, indicative of the number of samples upon which the attribute score is based, for weighting new samples, and a measure of variance among these samples (e.g., a standard deviation) for identifying outliers.

As described below, the user-profile records may be used for a variety of purposes. For example, publishers operating content server 22 may submit to the geolocation analytics platform 12 a query identifying one of the user-profile records, such as a hashed value of a user account number or phone number, and the geolocation analytics platform 12 may respond with the attributes of the corresponding user at the current time. In some embodiments, to further enhance user privacy, queries may be submitted for a specific attribute to determine whether to serve content corresponding to the attribute, or a query may request a binary indication of whether the attribute score is above a threshold.

In another example, the user-profile repository 38 may be used by the user profiler 56 to augment the records in the geographic information system 36. For example, an index may be created for each attribute that identifies tiles where users having relatively strong scores (e.g. above a threshold) for the respective attribute tend to co-occur at given times. These indices may correspond to heat maps (though no visual representation need be created) indicating where, for example, users interested in golf tend to be during various times of the day, such that content-providers can select content based on this information, or related services may be positioned nearby. In some embodiments, an index may be created for each user attribute at each of the above-described divisions of time in the geographic information system 36, and these indices may be queried to provide relatively prompt responses relating to where users having a given attribute or combination of attributes tend to co-occur at various times. Precalculating the indices is expected to yield faster responses to such queries than generating responsive data at the time the query is received. For instance, using examples of these indices relating to fishing and employment in banking, an advertiser may determine that people who engage in fishing on the weekend and work in banking tend to drive relatively frequently along a particular stretch of road on Mondays during the evening commute, and that advertiser may purchase an advertisement for bass fishing boats as a source of relaxation for bankers on a billboard along that road in response.

In some cases, user profiles may be supplemented with data from the user-data providers 20. In some embodiments, a user-data repository 40 may store such data as it is acquired for further analysis. Further, in some embodiments, the quality of data from such data providers may be scored, and such scores may be associated with identifiers of the providers in the user-data repository 40. In some embodiments, this data may be down-weighted or rejected based on indicators of low-quality.

Some embodiments may include an audience repository 40 storing records by which audience membership may be determined. These records, in some cases may be created and accessed by an audience classifier 54 described below with reference to FIGS. 2 and 3. In some cases, audience membership is pre-calculated before a query is received, for example, for each recognize query within some parameter space, for instance, for every type of attribute record, pair of attribute records, or attribute record combined with larger geolocation area, like weekend golfers in the state of Texas. In some cases, parameters of models by which audience membership is determined may be stored in the audience repository 42, for example, learned parameters that are pre-calculated according to training sets. In some cases, an audience membership vector may be calculated based on a given geographic location, a given user identifier (e.g., a device identifier), and given time, with each component of the vector indicating membership in a corresponding audience. In some cases, membership may be binary, or some embodiments may score membership, for example from 0 to 10 depending on the probability of membership in the corresponding audience given the inputs. In some cases, each component of the audience vector may be calculated according to an audience member function that is a combination (e.g., weighted sum) of feature functions. Examples of such feature functions may include scores indicating whether a given user is currently within a tile having a particular attribute score (or collection of attribute scores) above a threshold, whether a given user has visited tiles having a particular attribute score above a threshold at particular times more than a threshold amount of times within some trailing duration, and the like. In some cases, a collection of audience vectors for each user may be stored in the respective user profile, e.g., as a sparse matrix having rows or columns indexed according to times and geolocations at which the corresponding audience vector applies. In some cases, identifying feature functions with predictive value can be relatively challenging given the relatively large, high-dimensional search space of candidate feature functions in many commercially relevant implementations. Techniques for discovering such features are described in greater detail below with reference to FIG. 2.

Some embodiments may include a zone repository 44, which may include zone records populated by a zone classifier 52. Zones may be geographic areas associated with audiences. For example, some embodiments may identify geographic areas that students at a local university tend to visit, with the corresponding audience being likely students at a given university or collection of universities, or those who are regularly at such universities (e.g., more than a threshold amount of times in a trailing duration of time). In some cases, the zone repository may include zone records that list tiles or time tiles likely to be visited by members of particular audiences. In some cases, zones may be classified according to an amount of mutual information between of events corresponding to audience membership and members of those audiences visiting particular tiles. In some cases, the mutual information may be calculated in terms of a conditional entropy, and tiles having the highest mutual information (for example, greater than a threshold amount of tiles, like a threshold percentage) may be selected for consideration as members of the zone for that audience.

In some cases, the selected candidate tiles may be clustered and resulting clusters may be designated as zones. Some embodiments may execute a density-based clustering algorithm, like DBSCAN, to establish groups corresponding to the resulting clusters and exclude outliers. Some embodiments may examine each of the geolocations reflected in the records and designate a tile as a core tile if at least a threshold amount of the other tiles in the records are within a threshold geographic distance or number of tiles. Some embodiments may then iterate through each of the tiles and create a graph of reachable geolocations, where nodes on the graph are identified in response to non-core corresponding tiles being within a threshold distance of a core tile in the graph, and in response to core tiles in the graph being reachable by other core tiles in the graph, where two tiles are reachable from one another if there is a path from one tile to the other tile where every link and the path is a core tile and the tiles in the link are within a threshold distance of one another. The set of nodes in each resulting graph, in some embodiments, may be designated as a cluster, and points excluded from the graphs may be designated as outliers that do not correspond to clusters. Outliers may be excluded from zones in some cases.

Some embodiments may include a visit-metrics repository 46 having records created by a visitation rate module 48. In some cases, the records may indicate the degree to which content targeted to particular users succeeded in driving those users to visit a targeted geographic location, for example, records indicating whether an advertisement targeted to users in a particular neighborhood succeeded in driving those users to visit a particular store. In some cases, the visitation rate module 48 may include the visitation rate module of U.S. patent application Ser. No. 13/769,736, the entire contents of which are incorporated by reference. In some cases, visitation rates may be adjusted to account for undercounting of undetected people, for example, those not employing cell phones while in the targeted location or employing cell phones that are not detectable, for instance, due to lack of signal quality for a particular type of handset or carrier. In some cases, such undercounting may correlate with various attributes of the user, including the user's mobile device, and some embodiments may adjust detected visitation rates to account for such undercounting. Some embodiments may measure a marginal increase in an amount of visits to a target geographic location likely to be attributable to targeted content. For example, some embodiments may identify audience members, serve targeted content to some of the audience members (e.g., a treatment group), and compare visitation amounts (e.g., calculate a statistically significant amount of difference between) between those audience members that receive the targeted content and those that did not (e.g., a control group of the audience) to determine a marginal increase attributable to the targeted content. Feedback from such measurements may be used to tune audience classification algorithms or select among audiences, e.g., dynamically unselecting audiences for which a response fails to satisfy a visitation threshold. That said, not all embodiments necessarily provide these benefits, which is not to suggest that any other feature may not also be omitted in some cases.

Some embodiments may include a programmatic content targeter 50. In some cases, this module may automatically determine whether to provide content and which content to provide, in some cases at the time of the content request, based on classification of audiences or zones. In some embodiments, the programmatic content targeter 50 may programmatically determine audience membership and determine a bidding amount for submitting a bid to an online auction to provide an advertisement to a given user. To facilitate relatively fast responses to such time sensitive requests, some embodiments may pre-calculate zone classifications and audience classifications and index those classifications according to parameters of a content request (e.g., according to key values based on (such as hash values of) one or more of a device or user identifier, a geographic location, and a category of time corresponding to the time tile records). In some cases, bidding may be real-time, e.g., within less than 500 milliseconds of when an ad is requested, and often even sooner. In other cases, advertising space may be pre-purchased programmatically before ad requests, e.g., based on expected audience behavior in the coming hours or days. In other cases, other types of content may be programmatically targeted, e.g., business listings or articles based on audience membership. Programmatic targeting based on audience classification is expected to reduce labor costs relative to manual tuning and targeting of content. That said, not all embodiments necessarily provide these benefits, which is not to suggest that any other feature may not also be omitted in some cases.

Some embodiments may include an anonymized-user-identifier matcher 58, an example of which is described in U.S. patent application Ser. No. 14/334,066, the entire contents of which are incorporated by reference. In some cases, a user may switch mobile devices or be reassigned a device identifier. Re-creating a user profile for that user based on the new identifier can be time-consuming and particularly difficult at commercially-relevant scales. Accordingly, some embodiments of the matcher 58 may detect matches between geolocation patterns of a new user identifier and an old user identifier to assign that new identifier to an existing user profile when such matches are detected. This is expected to yield more accurate classifications of audiences based on more complete data for individuals using two different devices. That said, not all embodiments necessarily provide these benefits, which is not to suggest that any other feature may not also be omitted in some cases.

Some embodiments may further include a geographic-data projector 60, an example of which is described in U.S. patent application Ser. No. 13/938,974, the entire contents of which are incorporated by reference. In some cases, geographic-data providers may provide data at a relatively low resolution, e.g., census data reported at the zip code level. Some embodiments may un-evenly project such values onto higher-resolution geographic areas (e.g., some instances of the tile records or corresponding geographic features) within the low-resolution area based on a distribution of a population within that larger geographic area. Accordingly, some embodiments may enrich the records of the geographic information system 36 by which audiences and zones are identified with information that would otherwise be inapplicable or inaccurately applied. That said, not all embodiments necessarily provide these benefits, which is not to suggest that any other feature may not also be omitted in some cases.

Figure 2:
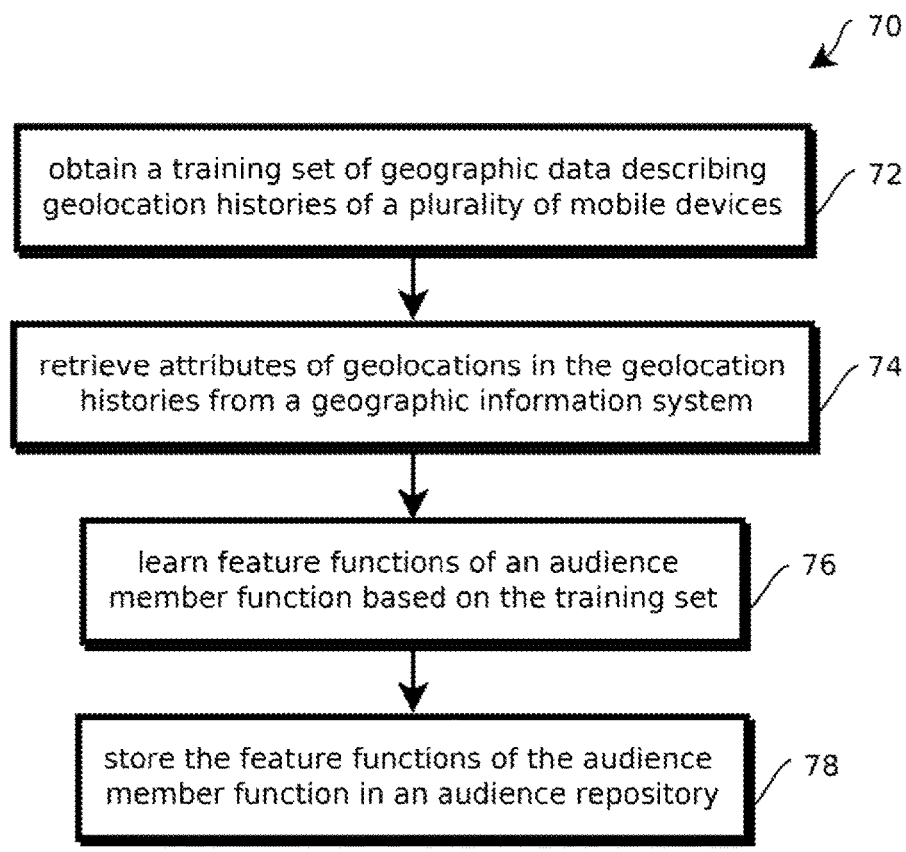
FIG. 2 shows an example of a process for learning an audience member function.
Figure 3:
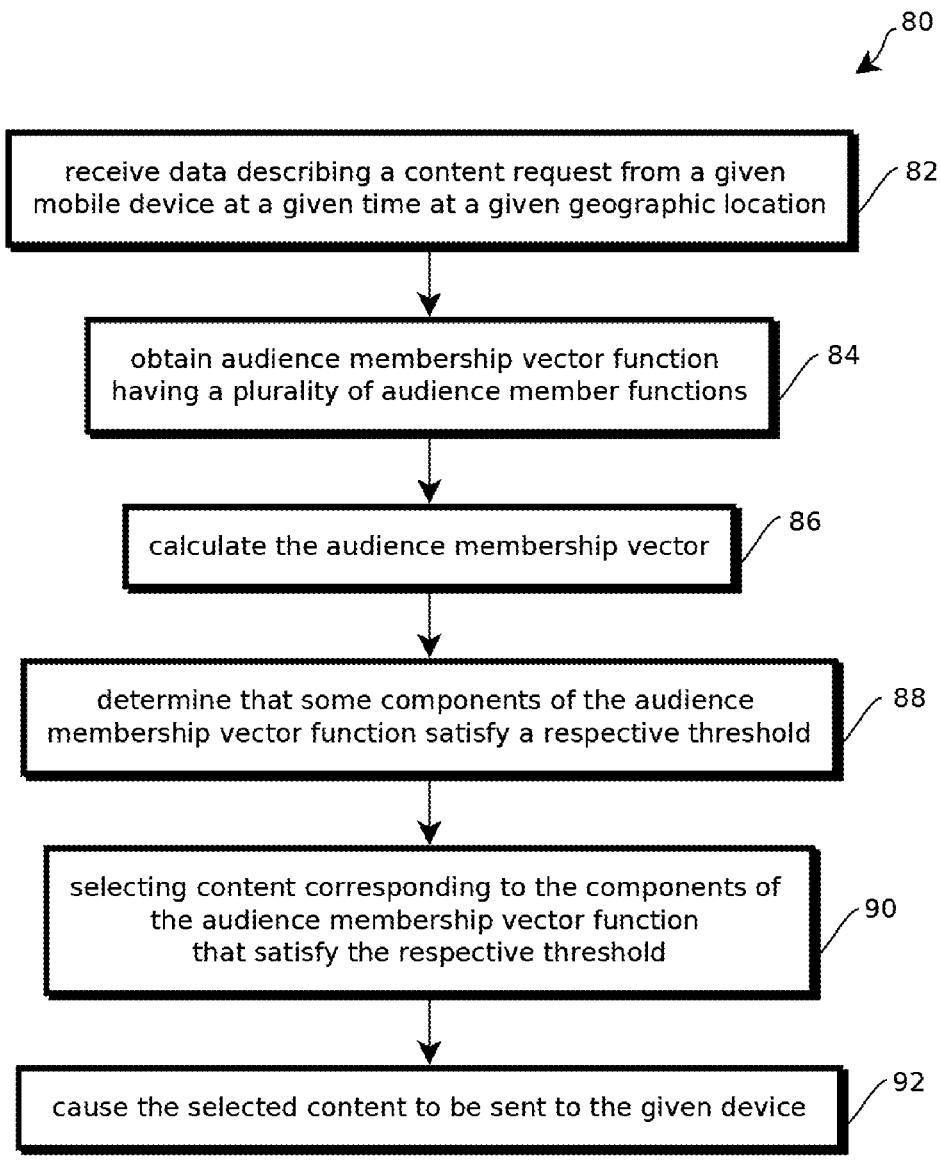
FIG. 3 shows an example of a process of targeting content based on an audience membership vector function including the audience member function of FIG. 2.

FIGS. 2 and 3 show techniques for modeling and detecting audiences. In some cases, the techniques may include an adaptive process by which features indicative of audience membership are programmatically learned, e.g., by iteratively modeling the audience and adjusting the model to reduce a measure of error produced by the model when applied to a training set of data in which audience membership status is known. Some embodiments may be configured to learn weights for combining (e.g., in a weighted sum, or in a neural net) features into a classification or score of probability of audience membership. Some embodiments may be configured for real-time model optimization by re-learning these parameters in the face of new data. Some embodiments may be configured to automatically discover, select, and score the importance of features in relatively high-dimensional data for classifying an audience.

FIG. 2 shows an example of a process 70 for learning an audience member function based on training data. In some cases, the model includes obtaining a training set of geographic data describing geolocation histories of a plurality of mobile devices, as indicated by block 72. Obtaining such a training set may include querying the user-profile repository 38 or the geographic information system 36 to identify users who have previously engaged in a targeted behavior. Targeted behaviors may serve as a training set selection criteria. In some cases, targeted behaviors include visiting a particular store within a threshold duration of time or with greater than a threshold frequency in a threshold duration of time. In another example a targeted behavior may include visiting a category of store according to such criteria. In another example, targeted behaviors may include exhibiting demographic attributes, like being a suburban young professional who plays golf on the weekend in the state of California more often than once a month over the trailing year. In some cases, training sets corresponding to relatively specific targeted behaviors may be retrieved relatively quickly with a distributed, scripted parallel program implemented with the techniques described in U.S. Provisional Patent Application 62/066,100, the contents of which are hereby incorporated by reference. Relatively fast, iterative exploration of candidate targeted behaviors with these techniques is expected to yield training sets suitable for creating well-crafted audiences. That said, not all embodiments provide this benefit, as various independently useful inventions are described herein.

The obtained training set may include geolocation histories, user profiles, and user data (e.g., financial transactions, television viewing patterns, social network activity, and the like) for each of a plurality of users who have exhibited the targeted behavior. In some cases, such data may include a relatively large number of dimensions, for example, including attribute scores for each of the above-described attributes, attribute scores for each of the above-attributes relating to behavior within some threshold duration of time, and attribute scores for each of the above described attributes relating to behavior with greater than a threshold frequency within a threshold duration of time. Further, such dimensions may include scores for the other user data, such as frequencies or amounts of financial transactions indicating purchases in a given category, such as frequencies or amounts of purchases within a threshold duration of time. Other examples may include amounts of adjacent nodes in a social network quantified with the above-described dimensions or frequency or amounts of viewing particular television shows or particular categories of television shows.

In some cases, the process 70 may include retrieving attributes of geolocations in the geolocation histories from a geographic information system, as indicated by block 74. In some cases, such attributes may be retrieved in the course of generating the above-described user profiles. In other cases, such attributes may be retrieved at the time of model training. For example, a given location history for a given user may indicate that the user within a given tile (for example, a particular tile for more than a threshold duration of time or more than a threshold frequency), and the attributes of that tile (or geographic feature, if independently tracked), or of that time tile may be retrieved from memory to serve as dimensions from which features are selected for an audience membership function. This technique may be used in cases in which the tiles correspond to or are overlaid with features, like polygons, corresponding to businesses in other geographic features to which attributes are mapped, by determining which features include the user's location and acquiring attributes of those features.

Some embodiments may learn feature functions of an audience member function based on the training set, as indicated by block 76. In some cases, audience member functions may be learned by training various types of machine learning classification or regression models, such as support vector machines, self organizing maps, binary classification decision trees, or regression decision trees.

By way of example, let device $d_z$ generate a content-request at time i within tile j, a request which may be represented as $r_{i,j,z}$. Some embodiments may obtain an audience-membership vector function $\bar{t}(r_{i,j,z})$ where its kth dimension has value 1 if device $d_z$ is deemed to belong to the kth audience in the audience set, and 0 otherwise. Other embodiments may produce a more fine-grained score indicative of membership, e.g., a value between 0 and 1. Some embodiments may detect K discrete audiences.

In one simpler case, the audiences represented in vector $\bar{t}(r_{i,j,z})$ are all categorical, audiences which are expressible as the intersection of tiles and time period categories, and device histories play no role in the audience membership functions ($f_k(\ )$). Thus, in this example, $\bar{t}(r_{i,j,z})=[f_1(i, j), f_2(i, j), \ldots, f_K(i, j)]$. In some cases, these functions may be pre-computed, before a content (e.g., ad) request is received and stored in sparse tables and cached in memory for fast retrieval.

In a more general case, some embodiments may compute $\bar{t}(r_{i,j,z})$ based on more general features. To this end, some embodiments may calculate an audience membership functions $f_k(r_{i,j,z})$ and determine whether resulting values satisfy a respective ones of a collection of thresholds $t_k$ so that:

$$\bar{t}_k = \begin{cases} 1 & \text{when } f_k(r_{i,j,z}) > t_k \\ 0 & \text{otherwise} \end{cases}$$

In some cases, thresholds $t_k$ may be heuristically established by an analyst and feature functions may be crafted by an audience designer. In other cases, such activities may be automated.

Some audience membership functions may consider richer features. In some cases, such functions may represent class posterior probabilities as follows:

$$f_k(r_{i,j,z})=p(\text{audience}=c_k|\text{features}_{r_{i,j,z}})$$

Where features$_{r\_sub\_i,j,z}$ is the collection of features generated after knowing i, j, and z, or the device (or user, in the case where a given user has multiple correlated devices), time, and location of the request.

Some embodiments may model these probabilities with an adaptive basis function model approach, such as that described in chapter sixteen of K Murphy. *Machine Learning: A probabilistic approach, Adaptive Computation and Machine Learning series* (The MIT Press, 2012), a chapter which is incorporated by reference. In some cases, such a model may be expressed as follows:

$$p(\text{audience} = c_k \mid \text{features}_{r_{i,j,z}}) \propto f_k(\text{features}_{r_{i,j,z}})$$

with the form:

$$f_k(\text{features}_{r_{i,j,z}}) = w_0 + \sum_{m=1 \ldots M} w_m \phi_m(i, j, z)$$

Where $\theta_m(i,j,z)$ is the m'th basis function that is learned from the training set, $w_m$ is the mean response in a region corresponding to the m'th basis function, and $w_0$ is an offset. In some cases, both weights and parameters of the basis function itself may be learned, in contrast to less expressive models that merely learn weights with a fixed basis function, like many simpler neural nets.

This formulation, in some cases, offers several advantages, allowing content targeters to robustly work with a combination of categorical and continuous features, large-dimensional spaces, missing values, kernel approaches, etc. Some embodiments may further include hierarchical models where probabilistic classifiers feed class posterior probabilities as features in this function. That said, not all embodiments provide these benefits, as various independently useful inventions are described.

In some cases, an audience member function may be learned by growing a binary regression or classification tree. In some cases, such a tree may be calculated, or grown, by recursively dividing a vector space occupied by the training data such that a training error is minimized in each division. In some cases, such divisions may be selected with a greedy algorithm that minimizes training error at a given iteration, rather than globally, to reduce computational complexity.

In some cases, the training data may be characterized as a collection of vectors, with each vector corresponding to an individual that engaged in the targeted behavior, and each component of such vectors corresponding to a candidate dimension from which a feature may be selected. As noted above, candid dimensions include, for example, various attribute scores of user profiles and tiles visited by users, in some cases, aggregated across trailing durations of time or quantified according to frequency within some trailing duration of time. In some cases, such vectors may have a relatively large number of dimensions, such as more than 10 for simpler cases, more than 1,000, and more than 10,000 for relatively rich data sets.

In some cases, a binary classification or regression decision tree may be grown by selecting a dimension and the value for that dimension in the vector space that minimizes or reduces a training error when the vector space is divided parallel to that dimension at that value, e.g., in a three-dimensional example, by a plane having a normal vector parallel to the chosen dimension and crossing an axis of the chosen dimension at the value chosen. Some embodiments may iterate through every dimension and every value (or between pair of adjacent values, when sorted) occupied by a vector in the training set in the respective dimension (as splits are expected to occur between values occupied by vectors) to calculate a training error for a split in vector space along that dimension between the respective values. Training errors for a plurality of candidate splits, each split being characterized by a pair identifying a value and a dimension, may be calculated, and some embodiments may select the split having the lowest training error.

In some cases, the training error may be characterized as an impurity measure indicative of the purity with which the candidate division in vector space, or split, separates vectors corresponding to audience members from vectors corresponding to non-audience members. For example, a division, or split, in which 9/10 vectors are audience members on one side and 8/10 vectors are non-audience members on the other may have a lower impurity measure relative to a division in which 6/10 vectors are audience members on one side and 7/10 vectors are non-audience members on the other side. Various impurity measures may be calculated, including a misclassification rate based on the proportion of vectors and each division that are misclassified if each division classifies according to a majority vote of vectors in the respective division. In other examples of an impurity measure, and entropy of audience members and non-audience members on each side of the division may be calculated or a Gini index may be calculated.

In some cases, to expedite processing, the evaluation of candidate splits may be executed in parallel by assigning different candidate dimensions and different candidate values within those dimensions to different computing nodes in a distributed computing network. For example, some embodiments may map candidate splits to one set of computing nodes and reduce impurity measures from the resulting regions with a different set of computing nodes, for instance, according to a MapReduce algorithm executed by a distributed computing network having a plurality of computing nodes, such separate computers or separate instances of virtual machines.

After a split, as a result of the split, the portion of vector space at issue may be divided into two regions divided in a selected dimension at a selected value. The division may be characterized as a node in a binary decision tree, the node corresponding to a split rule, like weekend golfer score greater than seven, and the two resulting regions may be characterized as edges extending from that node in a binary decision tree, each edge representing an outcome of the decision rule, like true or false. In some cases, the subregions corresponding to each of those edges may be recursively subjected to the above-described procedure for dividing a region of vector space such that the training error is minimized in the division of the portion of vector space at issue. Training vectors in one subregion may undergo the above process, and training vectors in the other subregion may separately undergo the above process, producing four sub-subregions. Such divisions may yield additional nodes in a decision tree corresponding to additional rules, for example, young professional attribute score less than three, and additional subdivisions of the vector space. This process may be repeated recursively until a stopping condition is satisfied in each branch of the binary decision tree.

A variety of stopping conditions may be evaluated before performing a split on a region of vector space. A determination may be made as to whether all vectors in the region of vector space are all members of the audience in the training set, or a determination may be made as to whether all vectors in the region of vector space are all not members of the audience in the training set. In either case, the region of vector space may not be further subdivided in response, and the resulting region may be designated as a leaf node indicating that vectors in the corresponding region are to be designated as audience members or not audience members, depending upon whether all members of the training set are audience members or not audience members. In another example of a stopping condition, some embodiments may count a number of training vectors in a candidate split or in a input region and decline to make the candidate split or further split the subregion in response to the count being less than a threshold value to avoid overfitting, e.g., with a large number of leaf nodes each corresponding to a single respective vector.

In some cases, the resulting leaf nodes of the binary decision tree may correspond to classifications of whether vectors in the regions of space described by those leaf nodes are audience members or not audience members. For example, if a majority of training vectors in a leaf node region are audience members, some embodiments may designate later-received, nontraining vectors (e.g., when the model is applied) in those regions as corresponding to audience members, and vice versa. The model may be applied by navigating the decision tree to a leaf node based on dimensions of a vector to be classified, and classifying the vector according to the leaf node's relative amount of audience member and non-audience member training vectors. In some cases, the designation may be associated with a confidence value corresponding to the impurity value of the region described by the leaf node.

In some embodiments, resulting decision trees may be pruned to reduce overfitting. For example, a training error may be calculated for each leaf node, the leaf nodes may be ranked according to training error, and those leaf nodes above a threshold position in the ranking, having the greater training errors, may be pruned from the tree.

In some embodiments, such decision trees may be relatively unstable and sensitive to relatively small changes in inputs. To mitigate such instabilities, some embodiments may perform a bootstrap aggregation by subsampling the training data, calculating binary decision trees on the subsamples in a plurality of iterations, and then aggregating the resulting plurality of decision trees to produce an aggregated binary classification decision tree.

The resulting binary classification decision tree (e.g., one or more per audience) may be stored in the audience repository, for example, by storing feature functions of the corresponding audience member function in the audience repository, as indicated by block 78. In some embodiments, such feature functions and the audience member functions to which they belong may be precalculated before audience classification is performed on nontraining data to facilitate relatively fast retrieval and classification. For example, audience member functions may be calculated daily or hourly for a particular geographic region in which a given content provider is interested, thereby providing relatively low latency audience classification that is responsive to changing conditions in user behavior.

FIG. 3 shows an example of a process 80 by which a request for content may be serviced by designating the request as corresponding to one or more audiences and selecting responsive content. In some embodiments, the process 80 includes receiving data describing the content requests from a given mobile device at a given time at a given geographic location, as indicated by block 82. In some cases, the request includes a device identifier that may be correlated to a user profile and location history, and a given time, and may be a timestamped geolocation, such as latitude and longitude, sensed by the mobile device, for example, at the time of a request for advertising content or other content.

Next, some embodiments may obtain an audience membership vector function having a plurality of audience member functions, as indicated by block 84. In some embodiments, some or all of the audience member functions may be learned with the process described above with reference to FIG. 2. In other cases, some of the audience member functions may be obtained with other techniques, such as hand-coded rules specifying particular time tiles that correspond to audiences. In some embodiments, the audience membership vector function may include a relatively large number of candidate audiences, such as more than 10, or more than 100, depending upon the granularity with which content is to be targeted. Relatively granular targeting is expected to facilitate selection of relatively highly customized content to which subgroups of populations are expected to be responsive. In some cases, the audience membership vector function may be retrieved from the audience repository 42, for example, by the audience classifier 54 at the direction of the programmatic content targeter 50, as shown in FIG. 1.

Next, some embodiments may calculate the audience membership vector, as indicated by block 86. In some cases, the request for content may be encoded as a vector, like those used in the training sets described above. For example, dimensions of the vector may include the current time, or corresponding time tile designation of the user, attributes of the user's current geolocation, such as tile attributes, and various attributes of a user profile or data in user location history of a user corresponding to a device identifier in the request for content. In some embodiments, for each dimension of the audience membership vector, a corresponding audience member function may be retrieved and calculated with the vector of the request as an input. In some cases, such calculation may include navigating a plurality of the binary classification decision trees produced with the above described techniques. In some embodiments, the request vector may be designated as corresponding to the respective audience based on whether a leaf node of the corresponding tree had a majority of training vectors in the audience or not in the audience (e.g., a majority in the audience means the input vector and corresponding request are classified as belonging to the audience, and vice versa).

Next, some embodiments may determine that some components of the audience membership vector function satisfy a respective threshold, as indicated by block 88. In some embodiments, each leaf node of a decision tree may include a confidence value, for example, indicating an amount of training error attributable to the respective leaf node. Request vectors mapped to a given leaf node may be associated with these confidence values, and the confidence values may be compared to a threshold corresponding to the respective audience described by the respective audience membership function of the audience membership vector function.

Next, some embodiments may select content corresponding to the components of the audience membership vector function that satisfy the respective threshold, as indicated by block 90. Some embodiments may rank responsive audiences based on confidence values, or some audiences may be deemed more valuable than others and may be selected even with lower confidence values. In some embodiments, each audience may be associated with a valuation score, and confidence values may be multiplied by the valuation scores to produce a ranking value from which responsive audiences are selected. In some embodiments, content may be mapped to multiple audiences, and audience ranking values may be aggregated according to content (for example, as a weighted sum) and the content ranked according to content ranking values. In some cases, the highest ranking content may be selected. In some cases, selecting content includes selecting a value that corresponds to content in another system, e.g., reporting audience membership by which another system retrieves content corresponding to the audience.

Next, some embodiments may cause the selected content to be sent to the given device, as indicated by block 92. Causing the content to be sent may include retrieving the content from memory and transmitting the content, sending instructions for the user device to retrieve the content from a third-party content hosting service, or sending data by which a decision to purchase the right to serve the content is made. In some cases, causing the content to be sent may include sending information upon which a bid in an advertising auction is calculated, for example, a binary value indicating audience membership that causes an advertiser to submit a bid in response.

In some embodiments, to expedite processing, calculation of the audience membership vector components may be executed in parallel, with each dimension being executed, for example, in a different thread or different computing node. In some embodiments, the component calculations may be mapped to a plurality of different computing nodes, and values of the components may be reduced by other computing nodes by comparing confidence values to threshold values, as described above, for example, with a MapReduce algorithm.

In some embodiments content, such as advertisements, business listings, articles, and the like may be selected according to correspondence with the responsive audiences. In some embodiments, content targeters may identify content in advance as being targeted to particular audiences. For example, an advertiser may wish to send a particular advertisement to young suburbanite professionals who golf on the weekends and frequent a particular store. In some cases, a training data set may be identified by querying existing records for users who have exhibited this targeted behavior. That training set may then be input to the process of FIG. 2 to train a model that identifies other users likely to engage in the targeted behavior as well. Later, when a new request for content is received, that request may be input into the resulting model, and audience membership may be detected, thereby indicating to an advertiser that the corresponding advertisement should be sent, as the user is likely to engage in the targeted behavior.

Some embodiments of the location analytics platform may include a module configured to infer consumer affinities based on shopping behaviors. In some cases, each (e.g., each and every, or each of a subset) user profile in the user-profile repository 38 may be associated with a plurality of affinity scores, each pertaining to a different type of shopping behavior, e.g., such as those enumerated below. In some cases, those affinities may be learned (e.g., by training a machine learning algorithm) using various data sources, such as retail stores or other places a user visited, purchasing behavior of the consumer, or media consumption patterns of the consumer. In some embodiments, such algorithms may produce a model of the frequency and duration of activity at various retail locations. In some embodiments, consumers may be clustered according to affinity scores (e.g., by converting affinity scores into vectors and clustering the vectors, for instance with a DBSCAN algorithm). In some embodiments, the clusters may segment users based on similar sets of activities, which is expected to create relatively powerful predictors for the segment, such as the following:

A) Likelihood to adopt a retail store based on the set of other retail stores they interact with B) Likelihood to change multiple retail store relationships based on changes in activities C) Likelihood to adopt certain products Resulting psychographics, in some implementations, are expected to be very powerful. Some embodiments may create a relatively detailed map of the stores people shop at and the products they buy. There is expected to be a strong relationship between stores and products. And in some cases, this extends beyond simpler 1:1 relationships. The way people shop for home goods is expected to be a predictor for how they change habits with dining or clothing for example.

Input data sources include both purchasing or (i.e., and/or) location data of consumers. One example of input data is movement data from sensors or the results of the above described processes, e.g., audience membership. Another example is purchasing data from point of sale systems or payment platforms (e.g., eBay™, mobile payment, or credit card payments). Based on such data consumer behavior may be modeled, and in some cases, consumers may be segmented, e.g., into audiences based on affinity to engage in various targeted behaviors.

Figure 4:
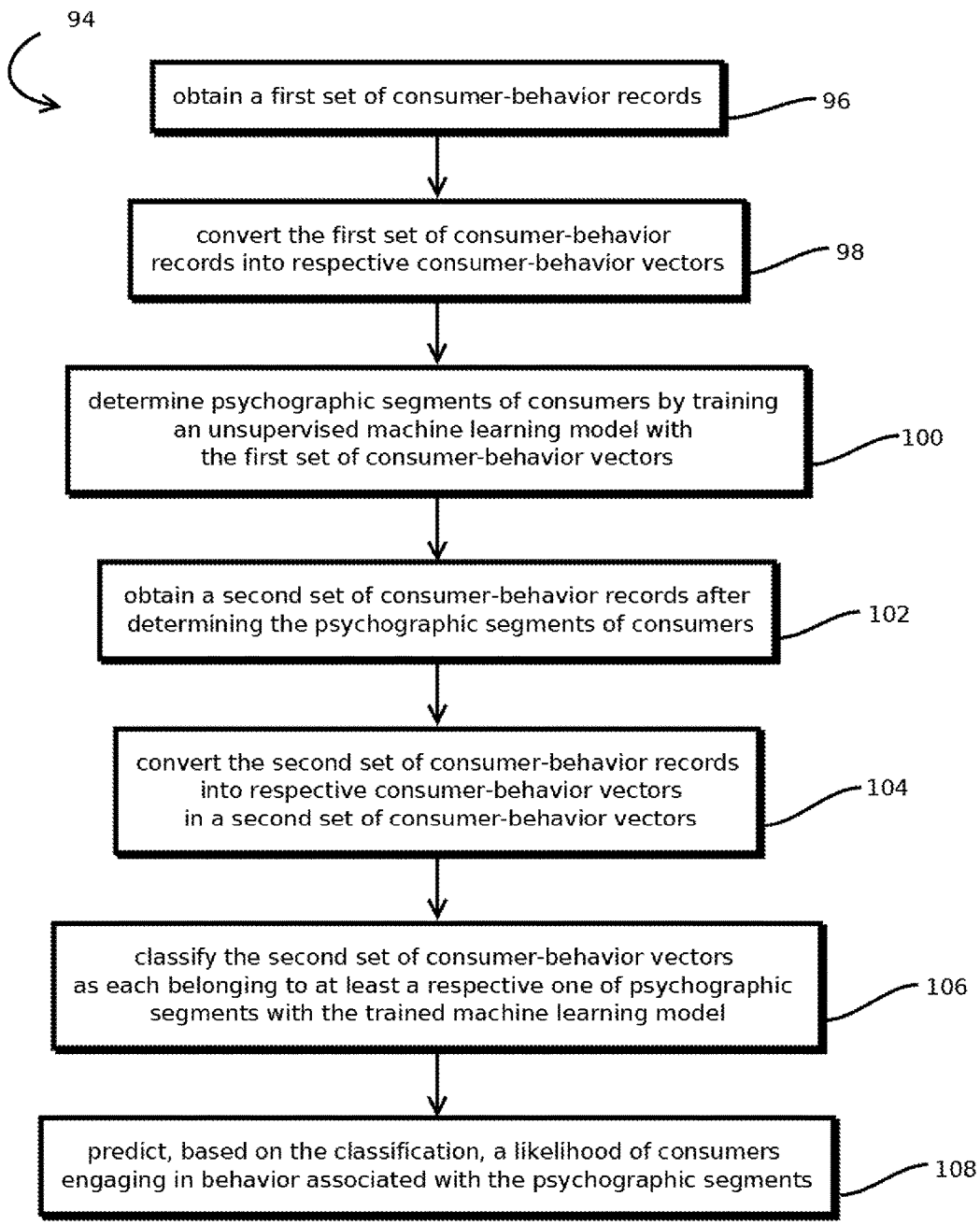
FIG. 4 shows an example of a process of segmenting consumers according to records of consumer behavior.

FIG. 4 illustrates a process 94 that develops models to predict the likelihood of consumers engaging in certain behavior. In some embodiments, the process 94 discovers segments of consumers with unsupervised machine learning techniques. In some embodiments, the process 94 may be performed by the above-described segmenter 13 shown in FIG. 1, though embodiments are not limited to that implementation.

In some embodiments, the process 94 includes obtaining a first set of consumer-behavior records, as indicated by block 94. In some embodiments, the consumer-behavior records may be retail (e.g., online or at brick-and-mortar location) purchase records, for example, purchase records extracted from an accounting system of a merchants or from a credit card processor. In some cases, the records may each identify a merchant, one or more items that were purchased, and a consumer (e.g. anonymously or non-anonymously). Additionally, or alternatively, the consumer-behavior records may be or include geolocation data indicative of geolocations (e.g., latitude and longitude coordinates, tiles, bounding polygons, or identifiers of businesses having a physical geolocation) at which consumers have engaged in purchasing behavior, like shopping or buying. In some cases, the consumer-behavior records may be the location histories described above. In some cases, the consumer-behavior records may be identifiers of wireless transmitters, like Wi-Fi access points or Bluetooth beacons, sensed by a native mobile application executing on a handheld wireless device carried by a consumer and returned by the native application to a central repository, like the system of FIG. 1. In some cases, the geolocation information may be a store identifier associated with a geolocation.

In some embodiments, a relatively large amount of consumer-behavior records may be obtained, for example, in a batch process, or accumulated over time. In one example, consumer behavior records may be accumulated over a trailing duration of time, like a day, week, month, or year, for instance, at a third party data provider, or at the above-describe system of FIG. 1. In some embodiments, the number of consumer-behavior records may exceed 10,000 such records, and in many commercially relevant embodiments, the number of records may exceed 1 million or 10 million such records.

Accordingly, some of the computing techniques described below may be performed and configured differently to accommodate such scales and improve the functioning of the computer system. For instance, some embodiments may pre-sort records according to the value of terms applied to thresholds to reduce cache misses. Some embodiments may construct multiple content-addressable versions of the records to expedite queries against various fields. Some embodiments may distribute portions of the data among different computing systems to perform the described operations concurrently.

In some cases, the consumer-behavior records may be formed by matching transaction records to user identifiers, thereby forming a record of multiple instances of consumer behavior, possibly at different geolocations of different stores and possibly including purchases of multiple items for each given consumer. In some embodiments, each consumer-behavior record, on average, may include three businesses visited by the respective consumer, five businesses visited by the respective consumer, or 10 businesses visited by the respective consumer, or more, depending upon the trailing duration of time over which the data is obtained and desired predictive power. Similarly, some embodiments may include such records having at least three products purchased by the respective consumer, at least five products, or at least 10 products purchased by the respective consumer, depending upon the amount of data obtained and desired predictive power. In some cases, the purchase records may include timestamps, and the consumer behavior records may include time information indicating when the different behaviors occurred, such that changes in such behavior may be detected.

Next, some embodiments may convert the first set of consumer-behavior records into respective consumer-behavior vectors, as indicated by block 98. In some cases, converting the records into vectors may include constructing a data structure including an ordered list of fields of information about each instance of consumer behavior. In some cases, the fields may be numeric, alphanumeric, categorical, ordinal, nominal, or take other forms. Data structures need not be labeled as vectors to constitute vectors. In some embodiments, a vector may be encoded as an object in an object-oriented programming language, with attributes of the object constituting components of the vector. In another example, vectors may be encoded in a hierarchical serialized data format, like JavaScript object notation, with the various components of the data structure constituting the components of the vector. In some cases, the data may be obtained in vector form, in which case converting the first set of consumer-behavior records into respective consumer-behavior vectors may be performed by validating that the data is properly formatted.

Next, some embodiments may determine psychographic segments of consumers by training an unsupervised machine learning model with the first set of consumer-behavior vectors, as indicated by block 100. In some cases, psychographic segments are expected to be more predictive of consumer behavior than purely demographic segments (though some embodiments are also consistent with demographic analysis). Obtaining psychographic segments, however, is often more difficult than obtaining demographic segments, as psychographic segments can be difficult to define in advance, and data associated with such segments often maps individuals to the segments with much less explicit precision, e.g., consumers rarely self-identify to others in structured data as having particular interests, opinions, or attitudes (or in some cases are even self-aware of such attributes). Some embodiments may perform dimensional reduction on relatively high dimensional data, such as the consumer-behavior records or the associated vectors to reveal previously unknown segments and develop models by which other consumers may be classified as belonging to the segments. In some cases, the consumer-behavior records and associated vectors are unlabeled data, and the segments are not known before performing the determination of block 100. In some cases, some of the segments may be known, while others are revealed, in which case the operation would still be considered unsupervised, as at least part of the resulting categories are revealed by the training process.

In some embodiments, the segments and models may be formed by clustering the first set of vectors in a parameter space defined by the range of values that the various fields of the vectors may take. In some cases, the various fields of the vectors may be weighted to emphasize some field's effect on the clustering process over others, for example, by multiplying those fields by a value like 1.2 to enhance the effect or by 0.8 to reduce the effect.

Nominal fields may be handled with a variety of techniques. In some cases, a cardinality of the field values may be determined, and each value assumed by the field may constitute a different dimension. In other cases, a taxonomy of the field may be obtained, and nominal values may be aggregated according to a higher level of a taxonomy to reduce the number of dimensions operate upon. The presence of an attribute may correspond to a 1 in vector space, with weightings applied to emphasize or de-emphasize particular nominal fields. The absence of an attribute may correspond to a zero.

Some embodiments may execute a density-based clustering algorithm, like DBSCAN, to establish segments corresponding to the resulting clusters and exclude outliers. To cluster the vectors, some embodiments may iterate through each of the vectors reflected in the records and designate a vector as a core vector if at least a threshold number of the other vectors are within a threshold distance in the parameter space. Some embodiments may then iterate through each of the vectors and create a graph of reachable vectors, where nodes on the graph are identified in response to non-core corresponding vectors being within a threshold distance of a core vector in the graph, and in response to core vectors in the graph being reachable by other core vectors in the graph, where vectors are reachable from one another if there is a path from one vector to the other vector where every link and the path is a core vector and is it within a threshold distance of one another. The set of nodes in each resulting graph, in some embodiments, may be designated as a cluster, and points excluded from the graphs may be designated as outliers that do not correspond to clusters. The clusters, in turn, may (partially or fully) define segments.

In some embodiments, clustering may be performed with a K means clustering algorithm. K-means may be favored when a number of segments desired is known in advance. In some cases, a number of clusters (referred to as K) may be obtained, e.g., specified by an analyst or estimated. Some embodiments may then place K points into the parameter space occupied by the vectors. In some cases, the initial placement may be random, e.g., pseudorandom. Next, some embodiments may assign each vector to the point that is closest in the parameter space. Then, some embodiments may calculate a centroid for each of the groups of vectors (with groups being defined by which point the vectors are assigned to). Some embodiments may then designate the centroids as the new points. The vector assignment and centroid re-calculation steps may be repeated iteratively until less than a threshold amount of vectors change groups between iterations (e.g., no vectors change). In some embodiments, a hierarchy of segments may be determined by repeating the clustering process on each segment, and each vector may be mapped to a genus, species, and in some cases, sub-species, each corresponding to a repetition of the process.

In some embodiments, the resulting clusters may be a local optimum resulting, and different initial conditions (e.g., different initial point selections) may yield better (e.g., with a smaller sum of root-mean-square distances between centroids and vectors) clusters. Accordingly, some embodiments may repeat the clustering process multiple times (e.g., more than five times) with different initial point selections (e.g., different random selections) and select a resulting set of clusters having the best clusters by the aforementioned measure. This approach is expected to improve the operation of the computer system relative to approaches by which a global solution is determined, as some implementations of this approach are NP-hard. In some embodiments, the different iterations may be performed concurrently, on multiple computing systems, e.g., by distributing tasks with Hadoop, Spark, or other cluster computing frameworks, with each device reporting back a measure of cluster quality and a master device selecting the iteration with the highest quality.

In some embodiments, resulting clusters may define envelopes in the parameter space of the vectors corresponding to psychographic segments. In some cases, a smallest radius that includes more than a threshold amount of the cluster may be determined as an approximated bounding area. In another example, a convex hull algorithm may determine the bounding area. For instance, the bounding area may be determined with a Jarvis march algorithm, a Graham scan, a Quickhull algorithm, a Divide and conquer algorithm, a Monotone chain algorithm, an Incremental convex hull algorithm, Chan's algorithm, or the like. In some cases, bounding areas may be determined based on angles between the vectors. Some embodiments may select a vector, such as closest to one (arbitrarily selected) extreme corner of the space, and then determine an angle formed by that vector and each of the other vectors. The vectors may then be sorted according to this angle. Embodiments may then iterate through the sorted sequence to determine whether a line between the two points preceding a given iteration indicate a left turn or a right turn. Upon determining that a left turn has incurred, the line between the points may be designated as indicating a portion of the convex hull. Or in another example, an embodiment may select a vector, such as closest to one (arbitrarily selected) extreme corner, determine the angle between that vector and each of the other vectors, and select a largest or smallest angle as indicating a portion of the convex hull. Embodiments may then proceed along that angled line to the other vector and repeat the process, wrapping around the convex hull, until the first vector is encountered. Some embodiments may produce a set of vertices corresponding to coordinates in the parameter space that encompass the cluster.

In some cases, segments may be characterized probabilistically in the parameter space, rather than having a binary threshold boundary, e.g., using the techniques described in a paper titled Convex Hulls under Uncertainty, by Pankaj K. Agarwal, Sariel Har-Peled, Subhash Suri, Hakan Yildiz, and Wuzhou Zhang. In some cases, a resulting function may output a probability that an input vector is a member of a segment.

In some embodiments, dimensionality of the vectors may be reduced by training a self organizing map of the vectors.

In some cases, a lattice of nodes (e.g., a two or three dimensional or higher dimensional lattice, but less than a dimensionality of the vectors) is defined. In some embodiments, each node of the lattice is defined by its coordinates in the lattice and a weight vector having a dimensionality matching that of the input vectors. Some embodiments may select an input vector (e.g., at random), and compare that vector to the weight vectors of each of the nodes. The input vector may be matched to the node having the closest weight vector. Nodes within a threshold distance (in lattice space) of the matching node may be determined. Next, the weight vectors of the nodes within the threshold distance may be adjusted to be more similar (e.g., by some coefficient) to the input vector. In some cases, the amount by which weight vectors are adjusted to match an input may decrease (e.g., linearly or exponentially) with later iterations. This process may be repeated for each of the input vectors, and the threshold distance may be decreased in later iterations. The resulting self-organizing map may map higher dimensional data (e.g., the parameter space) to a lower dimensional space (e.g., the lattice space). Some embodiments may cluster vectors in the lower dimension space with the above-described techniques.

A variety of other unsupervised techniques may be executed to reveal segments. In some embodiments, segments may be determined by executing a latent variable analysis, e.g., by forming a mixture model on the input vectors. Some embodiments may reduce dimensionality with principle component analysis. In some cases, the above-described MapReduce-based techniques may be used to expedite analysis, my concurrently operating on different portions or instances of a set of vectors.

Embodiments are not limited to unsupervised techniques. In some embodiments, supervise machine learning models may be trained and used to classify psychographic segments. For example, a subset of the consumer-behavior records may be labeled according to predetermined psychographic segments, and a neural network may be trained by executing a gradient descent algorithm.

Next, some embodiments may obtain a second set of consumer-behavior records after determining the psychographic segments of consumers, as indicated by block 102. In some cases, the second set may be obtained in response to a user computing device requesting content (e.g., an ad request for insertion in a web page or native mobile app), or in response to a later formed query or request to classify a set of new consumer-behavior records, such as records obtained more than a day, week, or month after determining the psychographic segments. In some cases, the second set of consumer-behavior records may again be relatively voluminous, for example, according to the numbers described above. In some embodiments, the models may be replicated on a relatively large number of computing devices, and different subsets of the consumer-behavior records may be assigned to the different computing devices to execute concurrent classification of the records to expedite operations, e.g., in accordance with the MapReduce techniques described above. In some cases, the use case may be particularly latency sensitive, for example, requiring responses within less than 500 milliseconds to serve content or less than 200 milliseconds to respond to an ad auction, and a similar concurrent architecture may be used to expedite operations, e.g., by assigning incoming requests to different computing devices in a round-robin fashion.

Next, some embodiments may convert the second set of consumer-behavior records into consumer-behavior vectors and thereby form a second set of consumer-behavior vectors, as indicated by block 104. This process may be substantially similar to one or more of the variations described above with reference to block 98.

Next, some embodiments may classify the second set of consumer-behavior vectors as each belonging to at least a respective one of the psychographic segments with the trained machine learning models, as indicated by block 106. In some cases, classification may include determining whether the vector is in or out of one of the above-described envelopes in a parameter space determined with a convex hull algorithm. In some cases, a classification score may indicate a distance between a center of such an envelope and the vector, such as a center of mass in the parameter space or among the vectors defining the space. In some cases, a best fit may be determined for vectors outside of the set of resulting clusters, for example, by identifying an envelope in the parameter space having a boundary that is closest to the vector or a center of mass that is closest to the vector, for instance, by ranking the clusters and selecting a closest cluster according to one or more of those measures. In some cases, the clusters may be reflected as probabilistic volumes, and the classification may be performed by determining a most probable volume, for instance, by inputting the new vector to a probability function obtained with the techniques above and then ranking the psychographic segments according to values of volumetric probability functions and selecting a highest probability (or set above some threshold probability or rank).

Next, some embodiments may predict, based on the classification, a likelihood of consumers engaging in behavior associated with the psychographic segment in which the respective vector was classified, as indicated by block 108. In some cases, the prediction may include predicting that a consumer who is engaged in 9 out of 10 behaviors that largely account for the clustering of the segment will engage in the 10th behavior. In some cases, predicting may entail predicting a likelihood to patronize a retail store patronized by others in the same segment. For example, some embodiments may rank retail stores visited by those in the segment by frequency of visits or amount of visits (as indicated in the consumer-behavior records of the first set), and a highest ranking retail store may be returned as a prediction, or scores may be provided for a set of such stores based on this measure (e.g., by normalizing the visit amounts among the set). In some embodiments, a highest ranking retail store not yet visited by the consumer may be returned as a prediction.

Some embodiments may predict products likely to be consumed by a given consumer associated with a vector. For example, some embodiments may rank products according to an amount or frequency of consumption by others in the same segment and return a highest ranking product as a prediction or a highest ranking product not currently consumed by the consumer as a prediction. Similarly, some embodiments may predict changes in collections of retail stores or products in response to a change in a consumer between segments, for instance, predicting a change to a new set of retail stores or products, such as a highest ranking by consumption or frequency amount of retail stores or products associated with the new segment to which a user has transitioned in response to changes in that user's behavior.

Some embodiments may send content to the consumer in response to determining such a prediction. For example, some embodiments may send advertisements associated with a predicted product or business, or some embodiments may cause a mass mailing to be directed to an address associated with the consumer. In some embodiments, bidding on an advertising slot to place an ad within a mobile native application or a webpage based on the prediction constitutes sending content, for instance, calculating a bid amount based on the prediction.

Figure 5:
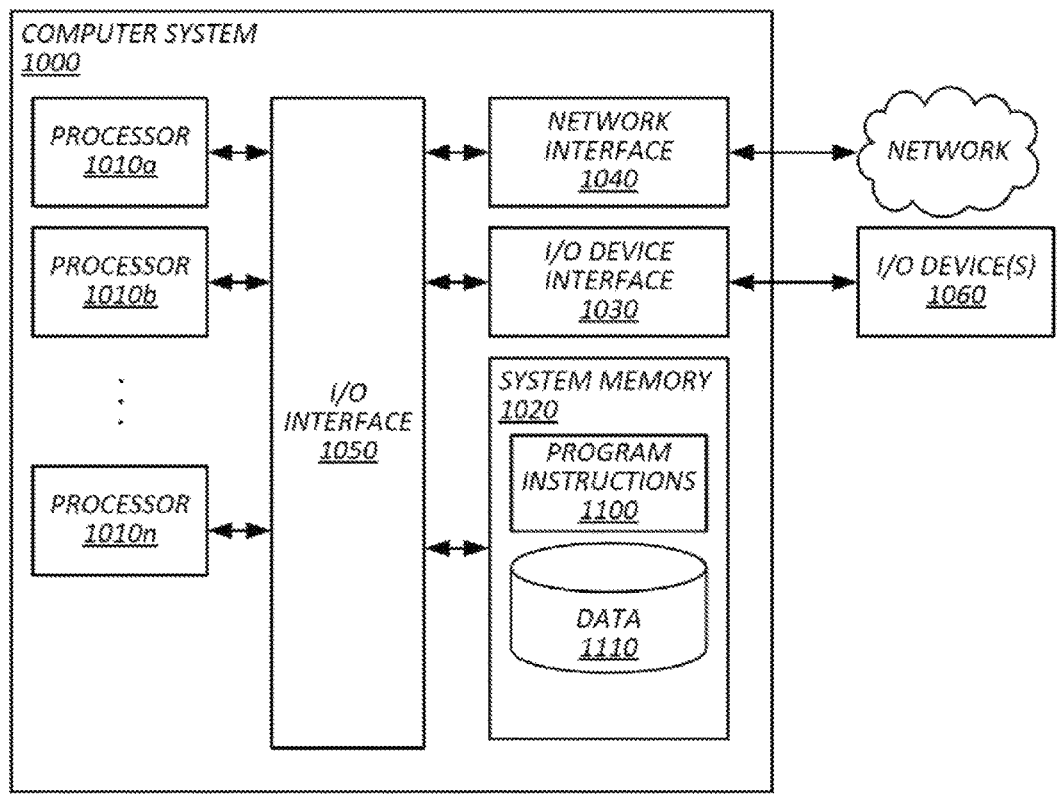
FIG. 5 shows an example of a computing device by which the above systems may be implemented.

FIG. 5 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices).

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is "based on" another condition or value encompass both instances in which the condition or value is the sole factor and instances in which the condition or value is one factor among a plurality of factors. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The present techniques will be better understood with reference to the following enumerated embodiments:

1. A method of discovering psychographic segments of consumers with unsupervised machine learning, the method comprising: obtaining, with one or more computers, a first set of more than 10,000 consumer-behavior records, each consumer-behavior record indicating, for a respective consumer, at least two businesses patronized by the respective consumer; converting, with one or more computers, the first set of consumer-behavior records into respective consumer-behavior vectors in a first set of consumer-behavior vectors; determining, with one or more computers, more than 5 psychographic segments of consumers by training an unsupervised machine learning model with the first set of consumer-behavior vectors, wherein the first set of consumer-behavior vectors are not labeled as members of any of the psychographic segments before determining the psychographic segments; obtaining, with one or more computers, a second set of consumer-behavior records after determining the psychographic segments of consumers; converting, with one or more computers, the second set of consumer-behavior records into respective consumer-behavior vectors in a second set of consumer-behavior vectors; classifying, with one or more computers, the second set of consumer-behavior vectors as each belonging to at least a respective one of psychographic segments with the trained machine learning model; and predicting, with one or more computers, based on the classification, for each of the second set of consumer behavior records, a likelihood of the respective consumer engaging in behavior associated with a corresponding one of the psychographic segments.

2. The method of embodiment 1, wherein determining more than 5 psychographic segments of consumers comprises: clustering the first set of consumer-behavior vectors based on pairwise distance in a parameter space defined by attributes of the consumer-behavior records.

3. The method of embodiment 2, wherein clustering the first set of consumer behavior vectors comprises determining that at least some vectors have more than a threshold number of other vectors within a threshold distance in the parameter space.

4. The method of embodiment 3, wherein determining more than 5 psychographic segments of consumers comprises: selecting N cluster centers for N candidate clusters from among the first set of vectors, where N is an integer greater than or equal to 5; assigning vectors in the first set to the candidate clusters based on distance from the respective cluster center; and iteratively updating the cluster centers to reduce an aggregate measure of distances from the vectors to cluster centers and re-assigning the vectors to updated clusters until less than a threshold amount of vectors change clusters between iterations.

5. The method of embodiment 1, wherein determining more than 5 psychographic segments of consumers comprises: learning at least one latent variable model with a mixture model of the first set of consumer-behavior vectors.

6. The method of embodiment 1, wherein determining more than 5 psychographic segments of consumers comprises: forming a 2 or higher dimensional lattice of nodes, each node having a node vector and a coordinate in the lattice, the node vector having the same number of dimensions as the vectors in the first set of consumer-behavior records; initializing the node vectors; selecting a given consumer-behavior vector from among the first set of consumer-behavior vectors; for each of at least half the nodes, determining a matching node having an associated node vector that is most similar to the given consumer-behavior vector; determining adjacent nodes within a threshold distance in the lattice; and adjusting node vectors of the adjacent nodes to be more similar to the given consumer-behavior vector.

7. The method of embodiment 1, wherein: determining more than 5 psychographic segments of consumers by training an unsupervised machine learning model with the consumer-behavior vectors comprises: determining at least 5 corresponding envelopes in a parameter space of the first set of consumer behavior records; classifying the second set of consumer-behavior vectors as each belonging to at least a respective one of psychographic segments with the trained machine learning model comprises: determining which parameter space envelope contains the respective member of the second set of consumer-behavior vectors.

8. The method of any of embodiments 1-7, wherein predicting a likelihood of the respective consumer engaging in behavior associated with a corresponding one of the psychographic segments comprises: predicting a likelihood to patronize a retail store patronized by others in the same segment.

9. The method of any of embodiments 1-8, wherein predicting a likelihood of the respective consumer engaging in behavior associated with a corresponding one of the psychographic segments comprises: predicting a likelihood to transition from patronizing one plurality of retail businesses to patronizing another plurality of retail businesses transitioned to by others in the same segment.

10. The method of any of embodiments 1-9, wherein predicting a likelihood of the respective consumer engaging in behavior associated with a corresponding one of the psychographic segments comprises: predicting a likelihood to consume a product consumed by others in the same segment.

11. The method of any of embodiments 1-10, wherein determining more than 5 psychographic segments of consumers by training an unsupervised machine learning model with the consumer-behavior vectors comprises performing steps for training an unsupervised machine learning model.

12. The method of any of embodiments 1-11, comprising: selecting content based on the prediction; and causing the content to be sent to a user.

13. A tangible, machine-readable media storing instructions that when executed by one or more computers effectuate operations comprising: the operations of any of embodiments 1-12.

14. A system, comprising: one or more processors, and memory storing instructions that when executed by at least some of the processors effectuate operations comprising: the operations of any of embodiments 1-12.

What is claimed is:

1. A method of discovering psychographic segments of consumers with unsupervised machine learning, the method comprising:

obtaining, with one or more computers, a first set of more than 10,000 consumer-behavior records, each consumer-behavior record indicating, for a respective consumer, at least two businesses patronized by the respective consumer;

converting, with one or more computers, the first set of consumer-behavior records into respective consumer-behavior vectors in a first set of consumer-behavior vectors;

determining, with one or more computers, more than 5 psychographic segments of consumers by training an unsupervised machine learning model with the first set of consumer-behavior vectors, wherein the first set of consumer-behavior vectors are not correctly labeled as members of any of the psychographic segments before determining the psychographic segments;

replicating, amongst a plurality of computers, the trained machine learning model;

obtaining, with one or more computers, a second set of consumer-behavior records after determining the psychographic segments of consumers, wherein respective ones of the consumer-behavior records in the second set are received in association with independent latency-constrained requests for content, the latency-constrained requests for content having a latency budget of less than 500 ms;

converting, with one or more computers, the second set of consumer-behavior records into respective consumer-behavior vectors in a second set of consumer-behavior vectors;

concurrently classifying, with one or more computers accessing respective ones of the replicated trained machine learning models, the respective ones of consumer-behavior vectors in the second set of consumer-behavior vectors as each belonging to at least a respective one of psychographic segments with the replicated trained machine learning model;

predicting, with one or more computers, based on the classification of the respective consumer-behavior vectors in the second set, for each of the consumer-behavior records in the second set, a likelihood of the respective consumer engaging in behavior associated with a corresponding one of the psychographic segments; and generating, for each independent latency-constrained request for content within 500 ms of receipt of the request, a response based on the associated prediction.

2. The method of claim 1, wherein determining more than 5 psychographic segments of consumers comprises:

clustering the first set of consumer-behavior vectors based on pairwise distance in a parameter space defined by attributes of the consumer-behavior records.

3. The method of claim 2, wherein clustering the first set of consumer behavior vectors comprises determining that at least some vectors have more than a threshold number of other vectors within a threshold distance in the parameter space.

4. The method of claim 3, wherein determining more than 5 psychographic segments of consumers comprises:

selecting N cluster centers for N candidate clusters from among the first set of vectors, where N is an integer greater than or equal to 5;

assigning vectors in the first set to the candidate clusters based on distance from the respective cluster center; and iteratively updating the cluster centers to reduce an aggregate measure of distances from the vectors to cluster centers and re-assigning the vectors to updated clusters until less than a threshold amount of vectors change clusters between iterations.

5. The method of claim 1, wherein determining more than 5 psychographic segments of consumers comprises:

learning at least one latent variable model with a mixture model of the first set of consumer-behavior vectors.

6. The method of claim 1, wherein determining more than 5 psychographic segments of consumers comprises an iterative mapping of vectors, the mapping comprising:

forming a data structure having 2 or higher dimensional lattice of nodes having a starting dimensionality less than a number of dimensions as the vectors in the first set of consumer-behavior records, each node having a node vector and a coordinate in the lattice, the node vector having the same number of dimensions as the vectors in the first set of consumer-behavior records;

initializing the node vectors;

selecting a given consumer-behavior vector from among the first set of consumer-behavior vectors;

for each of at least half the nodes, determining a matching node having an associated node vector that is most similar to the given consumer-behavior vector;

determining adjacent nodes within a threshold distance in the lattice; and adjusting node vectors of the adjacent nodes to be more similar to the given consumer-behavior vector; and reducing a dimension of the lattice of nodes in the data structure by at least one dimension over at least one iteration to map the first set of consumer-behavior vectors in a lower dimensional lattice space.

7. The method of claim 1, wherein:

determining more than 5 psychographic segments of consumers by training an unsupervised machine learning model with the consumer-behavior vectors comprises:

determining at least 5 corresponding envelopes in a parameter space of the first set of consumer behavior records;

classifying the second set of consumer-behavior vectors as each belonging to at least a respective one of psychographic segments with the trained machine learning model comprises:

determining which parameter space envelope contains the respective member of the second set of consumer-behavior vectors.

8. The method of claim 1, wherein predicting a likelihood of the respective consumer engaging in behavior associated with a corresponding one of the psychographic segments comprises:

predicting a likelihood to patronize a retail store patronized by others in the same segment.

9. The method of claim 1, wherein predicting a likelihood of the respective consumer engaging in behavior associated with a corresponding one of the psychographic segments comprises:

predicting a likelihood to transition from patronizing one plurality of retail businesses to patronizing another plurality of retail businesses transitioned to by others in the same segment.

10. The method of claim 1, wherein predicting a likelihood of the respective consumer engaging in behavior associated with a corresponding one of the psychographic segments comprises:

predicting a likelihood to consume a product consumed by others in the same segment.

11. The method of claim 1, wherein determining more than 5 psychographic segments of consumers by training an unsupervised machine learning model with the consumer-behavior vectors comprises performing steps for training an unsupervised machine learning model.

12. The method of claim 1, wherein the generated response based on the prediction causes a remote computing system to execute operations that comprise:

selecting content based on the prediction; and causing the content to be sent to a user.

13. A non-transitory, machine-readable media storing instructions that when executed by one or more computers effectuate operations comprising:

obtaining, with one or more computers, a first set of more than 10,000 consumer-behavior records, each consumer-behavior record indicating, for a respective consumer, at least two businesses patronized by the respective consumer;

converting, with one or more computers, the first set of consumer-behavior records into respective consumer-behavior vectors in a first set of consumer-behavior vectors;

determining, with one or more computers, more than 5 psychographic segments of consumers by training an unsupervised machine learning model with the first set of consumer-behavior vectors, wherein the first set of consumer-behavior vectors are not correctly labeled as members of any of the psychographic segments before determining the psychographic segments;

replicating, amongst a plurality of computers, the trained machine learning model;

obtaining, with one or more computers, a second set of consumer-behavior records after determining the psychographic segments of consumers, wherein respective ones of the consumer-behavior records in the second set are received in association with independent latency-constrained requests for content, the latency-constrained requests for content having a latency budget of less than 500 ms;

converting, with one or more computers, the second set of consumer-behavior records into respective consumer-behavior vectors in a second set of consumer-behavior vectors;

concurrently classifying, with one or more computers accessing respective ones of the replicated trained machine learning models, the respective ones of consumer-behavior vectors in the second set of consumer-behavior vectors as each belonging to at least a respective one of psychographic segments with the replicated trained machine learning model;

predicting, with one or more computers, based on the classification of the respective consumer-behavior vectors in the second set, for each of the consumer-behavior records in the second set, a likelihood of the respective consumer engaging in behavior associated with a corresponding one of the psychographic segments; and generating, for each independent latency-constrained request for content within 500 ms of receipt of the request, a response based on the associated prediction.

14. The media of claim 13, wherein determining more than 5 psychographic segments of consumers comprises:
clustering the first set of consumer-behavior vectors based on pairwise distance in a parameter space defined by attributes of the consumer-behavior records.

15. The media of claim 14, wherein clustering the first set of consumer behavior vectors comprises determining that at least some vectors have more than a threshold number of other vectors within a threshold distance in the parameter space.

16. The media of claim 15, wherein determining more than 5 psychographic segments of consumers comprises:
selecting N cluster centers for N candidate clusters from among the first set of vectors, where N is an integer greater than or equal to 5;
assigning vectors in the first set to the candidate clusters based on distance from the respective cluster center; and
iteratively updating the cluster centers to reduce an aggregate measure of distances from the vectors to cluster centers and re-assigning the vectors to updated clusters until less than a threshold amount of vectors change clusters between iterations.

17. The media of claim 13, wherein determining more than 5 psychographic segments of consumers comprises:
learning at least one latent variable model with a mixture model of the first set of consumer-behavior vectors.

18. The media of claim 13, wherein determining more than 5 psychographic segments of consumers comprises:
forming a 2 or higher dimensional lattice of nodes, each node having a node vector and a coordinate in the lattice, the node vector having the same number of dimensions as the vectors in the first set of consumer-behavior records;
initializing the node vectors;
selecting a given consumer-behavior vector from among the first set of consumer-behavior vectors;
for each of at least half the nodes, determining a matching node having an associated node vector that is most similar to the given consumer-behavior vector;
determining adjacent nodes within a threshold distance in the lattice; and
adjusting node vectors of the adjacent nodes to be more similar to the given consumer-behavior vector.

19. The media of claim 13, wherein:
determining more than 5 psychographic segments of consumers by training an unsupervised machine learning model with the consumer-behavior vectors comprises:
determining at least 5 corresponding envelopes in a parameter space of the first set of consumer behavior records;
classifying the second set of consumer-behavior vectors as each belonging to at least a respective one of psychographic segments with the trained machine learning model comprises:
determining which parameter space envelope contains the respective member of the second set of consumer-behavior vectors.

20. The media of claim 13, wherein predicting a likelihood of the respective consumer engaging in behavior associated with a corresponding one of the psychographic segments comprises:
predicting a likelihood to patronize a retail store patronized by others in the same segment.

21. The media of claim 13, wherein predicting a likelihood of the respective consumer engaging in behavior associated with a corresponding one of the psychographic segments comprises:
predicting a likelihood to transition from patronizing one plurality of retail businesses to patronizing another plurality of retail businesses transitioned to by others in the same segment.

22. The media of claim 13, wherein predicting a likelihood of the respective consumer engaging in behavior associated with a corresponding one of the psychographic segments comprises:
predicting a likelihood to consume a product consumed by others in the same segment.

23. The media of claim 13, wherein determining more than 5 psychographic segments of consumers by training an unsupervised machine learning model with the consumer-behavior vectors comprises performing steps for training an unsupervised machine learning model.

24. The media of claim 13, wherein generating the response based on the prediction comprises:
selecting content based on the prediction; and
causing the content to be sent to a user.

* * * * *